(12) United States Patent
Jung et al.

(10) Patent No.: US 11,082,921 B2
(45) Date of Patent: Aug. 3, 2021

(54) APPARATUS AND METHOD FOR COMMUNICATION BETWEEN DEVICES IN CLOSE PROXIMITY IN WIRELESS NETWORK

(71) Applicant: Samsung Electronics Co., Ltd., Gyeonggi-do (KR)

(72) Inventors: Buseop Jung, Gyeonggi-do (KR); Doosuk Kang, Gyeonggi-do (KR); Sunkee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 16/674,167

(22) Filed: Nov. 5, 2019

(65) Prior Publication Data
US 2020/0145919 A1 May 7, 2020

(30) Foreign Application Priority Data
Nov. 7, 2018 (KR) .......................... 10-2018-0135933

(51) Int. Cl.
*H04W 8/00* (2009.01)
*H04W 52/02* (2009.01)
(Continued)

(52) U.S. Cl.
CPC ...... *H04W 52/0216* (2013.01); *H04B 5/0031* (2013.01); *H04L 67/16* (2013.01);
(Continued)

(58) Field of Classification Search
CPC ..... H04W 8/005; H04W 48/16; H04W 84/20; H04W 40/22
See application file for complete search history.

(56) References Cited

U.S. PATENT DOCUMENTS 9,686,369 B2    6/2017  Patil et al.
2016/0270137 A1 9/2016  Yong et al.
(Continued)

FOREIGN PATENT DOCUMENTS

JP         5422325 B2      11/2013
KR    10-2017-0042639 A    4/2017
KR    10-2018-0048907 A    5/2018

OTHER PUBLICATIONS

P.I Basarkod et al., 'Node movement Stability and Congestion aware Anycast Routing in Mobile Ad hoc Networks', In: 2014 IEEE International Advance Computing Conference (IACC), IEEE, Mar. 27, 2014 See pp. 124-130.
(Continued)

*Primary Examiner* — Tu X Nguyen
(74) *Attorney, Agent, or Firm* — Cha & Reiter, LLC.

(57) ABSTRACT

Disclosed are a method and an apparatus for reducing current consumption between proximity electronic devices in a NAN based low-power near field communication network. An electronic device may include a processor configured to: broadcast a first signal notifying that the electronic device can operate as a first proxy server, receive a first proxy client registration request from a first external electronic device, transmit a first proxy client registration response, receive a fourth signal notifying that a second external electronic device can operate as a second proxy server, transmit a second proxy client registration request to the second external electronic device, receive a second proxy client registration response from the second external electronic device, and operate the electronic device as a first proxy client of the second external electronic device in parallel with operating the electronic device as the first proxy server of the first external electronic device.

15 Claims, 12 Drawing Sheets

(51) Int. Cl.
  *H04L 29/08* (2006.01)
  *H04B 5/00* (2006.01)
  *H04W 56/00* (2009.01)
  *H04W 84/20* (2009.01)
  *H04W 88/04* (2009.01)
(52) U.S. Cl.
  CPC ............ *H04L 67/28* (2013.01); *H04W 8/005* (2013.01); *H04W 56/0015* (2013.01); *H04W 84/20* (2013.01); *H04W 88/04* (2013.01)

(56) References Cited

U.S. PATENT DOCUMENTS

| | | |
|---|---|---|
| 2016/0352842 A1 | 12/2016 | Patil et al. |
| 2017/0187819 A1 | 6/2017 | Aizman et al. |
| 2017/0290029 A1 | 10/2017 | Park et al. |
| 2018/0098211 A1* | 4/2018 | Park .................. H04W 8/06 |
| 2018/0139600 A1 | 5/2018 | Kim et al. |
| 2018/0255147 A1 | 9/2018 | Yoshikawa et al. |

OTHER PUBLICATIONS

International Search Report dated Feb. 12, 2020.

* cited by examiner

APPARATUS AND METHOD FOR COMMUNICATION BETWEEN DEVICES IN CLOSE PROXIMITY IN WIRELESS NETWORK

CROSS-REFERENCE TO RELATED APPLICATION

This application is based on and claims priority under 35 U.S.C. 119 to Korean Patent Application No. 10-2018-0135933, filed on Nov. 7, 2018, in the Korean Intellectual Property Office, the disclosure of which is incorporated by reference herein in its entirety.

BACKGROUND

Field

Certain embodiments of the instant disclosure generally relate to an apparatus and method for communication between electronic devices (e.g., neighbor awareness networking (NAN) devices) in close proximity in a wireless network (e.g., low-power near field communication network based on NAN).

Description of Related Art

Recently, as digital technology has developed, various types of electronic devices, such as mobile communication terminals, smart phones, tablet personal computers (PC), notebook computers, wearable devices, digital cameras, personal computers, and Internet of things (IoT) device, have been widely deployed. Further, various types of proximity services using low-power discovery technology have recently been developed. For example, proximity services (or proximity communication services) whereby electronic devices in close proximity can quickly exchange data through a proximity network have been developed. Such proximity services may include a low-power proximity service using Bluetooth low-energy (BLE) beacons, or low-power proximity services based on low-power near field communication technology (e.g., neighbor awareness networking (NAN)) in the context of wireless local area networks (WLAN).

According to an embodiment, in a NAN based low-power proximity service (hereinafter referred to as a "proximity service"), the configuration of the proximity network may be dynamically changed in accordance with the movement of electronic devices within the proximity network. A set of electronic devices constituting the proximity network may be called a cluster. The electronic devices included in the cluster may transmit and receive signals for discovery (e.g., beacons or beacon signals) and service discovery frames (SDFs) to and from each other in a synchronized time duration (or communication duration). For example, at least one electronic device in the cluster may transmit a signal for notifying of the existence of the cluster, and a new electronic device that wants to join the cluster may receive the signal.

In order to reduce current consumption or power consumption, the electronic devices in the cluster may each have different active durations in which they can transmit and receive signals. In NAN communication, the active duration in which a signal can be transmitted or received may be called a discovery window (DW). Further, the electronic devices included in the cluster may reduce current consumption by maintaining a low-power state (e.g., sleep state) outside of the active duration. An electronic device that serves as a NAN proxy server may consume more power than a device that serves as a NAN proxy client.

SUMMARY

According to an embodiment, an electronic device may include a housing; at least one antenna; at least one wireless communication circuitry located in the housing, operatively connected to the antenna, and configured to support a neighbor awareness networking (NAN) protocol; a processor located in the housing and operatively connected to the wireless communication circuitry; and a memory operatively connected to the processor, wherein the memory stores instructions that, when being executed, cause the processor to: broadcast a first signal notifying that the electronic device can operate as a first proxy server through the wireless communication circuitry, receive a second signal including a first proxy client registration request from a first external electronic device, transmit a third signal including a first proxy client registration response to the first external electronic device in response to the second signal, receive a fourth signal notifying that a second external electronic device can operate as a second proxy server from the second external electronic device through the wireless communication circuitry while operating as the first proxy server of the first external electronic device, transmit a fifth signal including a second proxy client registration request to the second external electronic device based on the fourth signal, receive a sixth signal including a second proxy client registration response corresponding to the fifth signal from the second external electronic device, and operate the electronic device as a first proxy client of the second external electronic device in parallel with operating the electronic device as the first proxy server of the first external electronic device.

According to an embodiment, an electronic device may include a housing; at least one antenna; at least one wireless communication circuitry located in the housing, operatively connected to the antenna, and configured to support communication at a discovery window (DW) awake interval synchronized with an external electronic device in a same neighbor awareness networking (NAN) cluster based on a NAN protocol; a processor located in the housing and operatively connected to the wireless communication circuitry; and a memory operatively connected to the processor, wherein the memory stores instructions that, when being executed, cause the processor to: perform a service discovery at the discovery window awake interval through the wireless communication circuitry, receive a first signal notifying that the external electronic device can operate as a proxy server from the external electronic device, perform a proxy server negotiation with the external electronic device based on the received first signal, and operate the electronic device as the proxy server of the external electronic device or operate the electronic device as a proxy client of the external electronic device based on the performed proxy server negotiation.

According to an embodiment, an operation method of an electronic device may include broadcasting a first signal notifying that the electronic device can operate as a first proxy server; receiving a second signal including a first proxy client registration request from a first external electronic device; transmitting a third signal including a first proxy client registration response to the first external electronic device in response to the second signal; receiving a fourth signal notifying that a second external electronic device can operate as a second proxy server from the second external electronic device while operating as the first proxy server of the first external electronic device; transmitting a fifth signal including a second proxy client registration request to the second external electronic device based on the fourth signal; receiving a sixth signal including a second proxy client registration response corresponding to the fifth signal from the second external electronic device; and operating the electronic device as a first proxy client of the second external electronic device in parallel with operating the electronic device as the first proxy server of the first external electronic device.

According to the one embodiment of the disclosure to solve the above-described problems, a computer readable recording medium recorded with a program for a processor to execute the above-described method may be included.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Certain embodiments disclosed herein relate to an apparatus and method capable of improving current consumption of a NAN electronic device that is using a NAN service discovery proxy function.

Certain embodiments disclosed herein relate to an apparatus and method for enabling an electronic device to dynamically (or adaptively) select one or more functions of a NAN proxy server and a NAN proxy client in order to improve current consumption.

Figure 1:
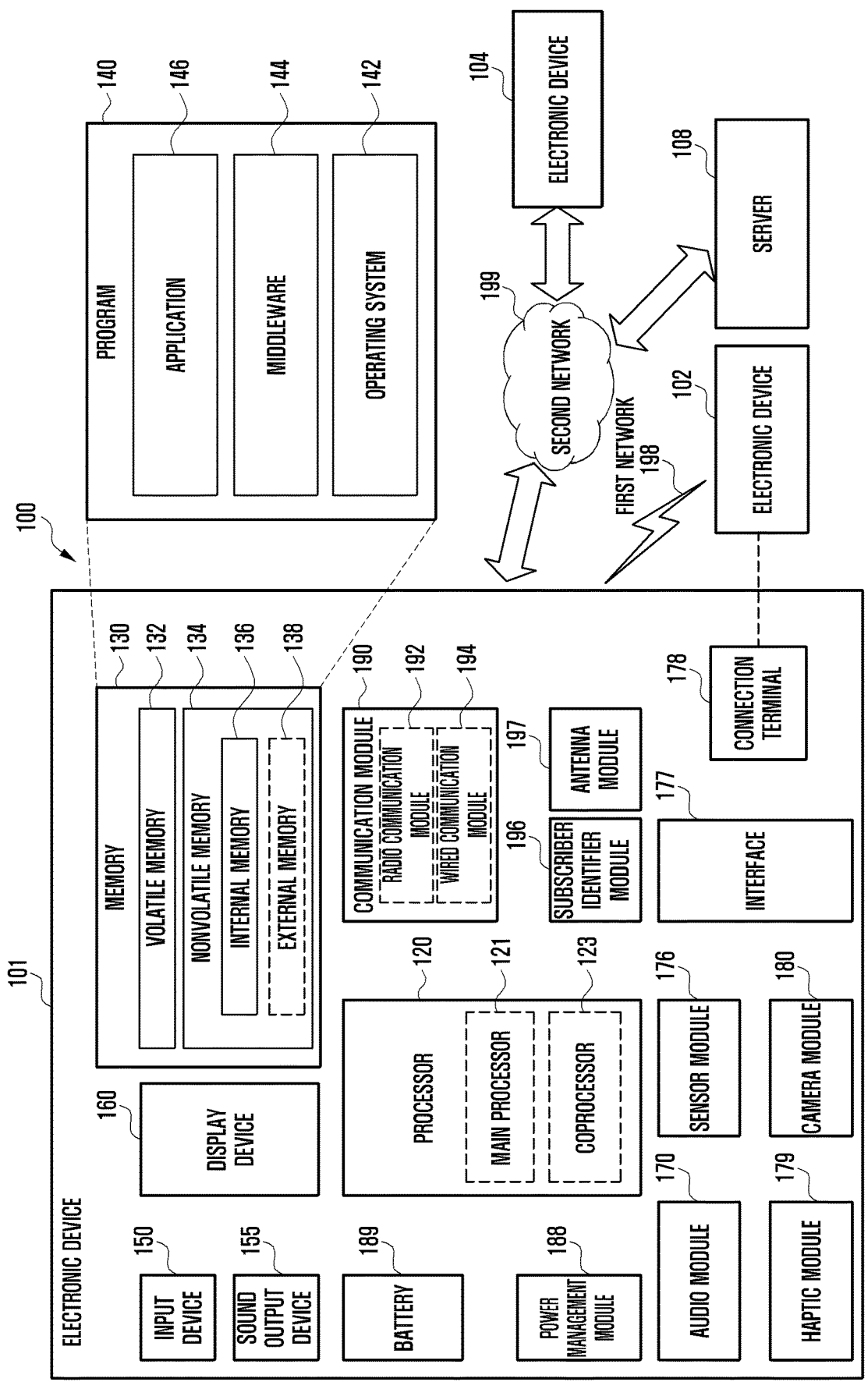
FIG. 1 is a block diagram of an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, methods according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
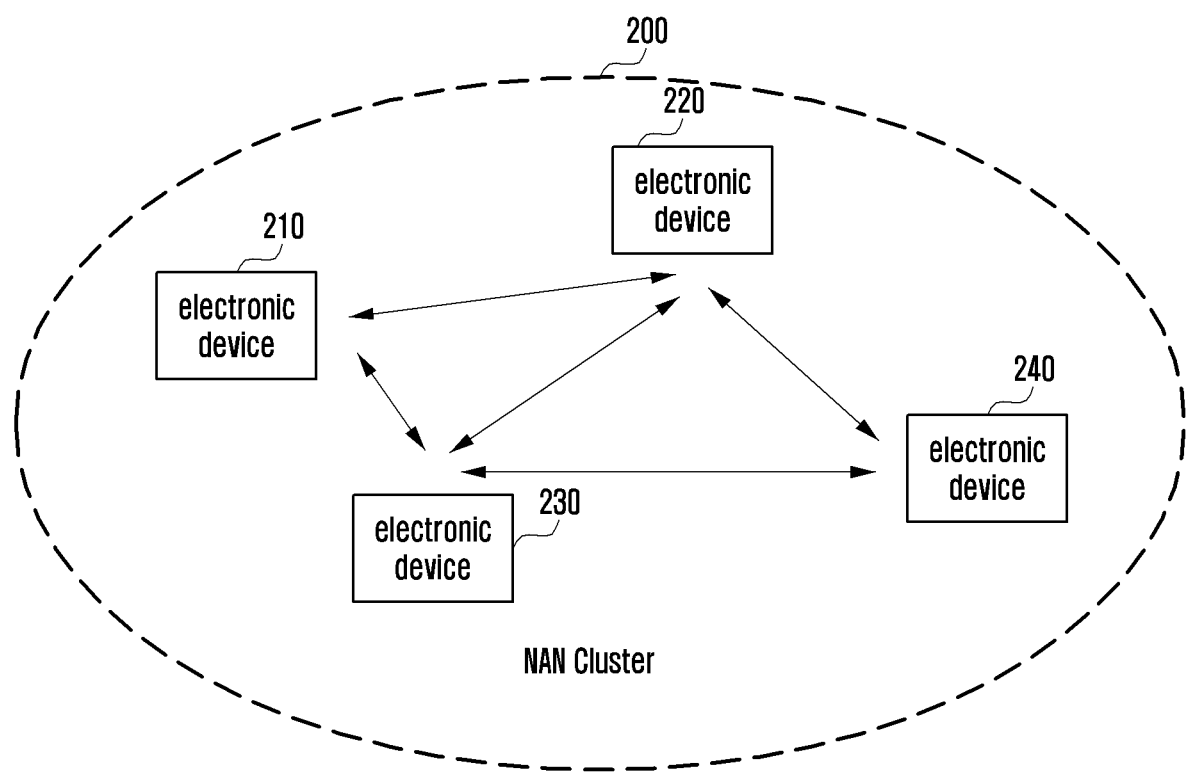
FIG. 2 is a block diagram illustrating an example of a system configuration according to an embodiment.

FIG. 2 is a block diagram illustrating an example of a system configuration according to an embodiment.

For example, FIG. 2 shows an exemplary configuration of a NAN cluster 200 as a proximity network according to an embodiment. In the following description, the cluster 200 may include a set of electronic devices 210, 220, 230, and 240 constituting a proximity network so that the electronic devices (or NAN devices) 210, 220, 230, and 240 can mutually transmit and receive data. As such, the cluster 200 may be called a NAN cluster in accordance with various NAN standards.

With reference to FIG. 2, the cluster 200 may be composed of the plurality of electronic devices 210, 220, 230, and 240. The electronic devices 210, 220, 230, and 240 included in the cluster 200 may transmit and receive beacons (or discovery beacons) and service discovery frames (SDFs) in a synchronized time duration (or communication duration) (e.g., discovery window (DW)). For example, the electronic devices 210, 220, 230, and 240 in the cluster 200 have time clocks synchronized with each other, and thus they can send and receive beacons and SDFs to and from each other in the same discovery window. According to an embodiment, an electronic device supporting a NAN based low-power near field communication technology may broadcast discovery signals (e.g., beacons) so that it can be discovered by another electronic device in a predetermined first interval (e.g., about 100 msec), and it may receive a discovery signal being broadcasted from the other electronic device by performing scanning in a predetermined second interval (e.g., about 10 msec). According to an embodiment, an electronic device may recognize at least one other electronic device located around the electronic device based on the discovery signal received through the scanning, and it may perform time and channel synchronization with the recognized electronic device.

For example, as shown in FIG. 2, each of the plurality of electronic devices 210, 220, 230, and 240 may form one cluster 200 by transmitting and receiving beacons to and from the other electronic devices 210, 220, 230, and 240, and the electronic devices 210, 220, 230, and 240 in the cluster 200 may perform time and channel synchronization. In an embodiment, time and channel synchronization may be performed based on time and channel of the electronic device having highest master preference in the cluster. For example, the electronic devices 210, 220, 230, and 240 in the cluster 200 may exchange signals for master preference information indicating the devices' preferences for operating as an anchor master with each other. And through the exchanged signals, the electronic devices may determine the electronic device having the highest master preference as the anchor master (or master device). According to an embodiment, the anchor master may be the electronic device upon which time and channel synchronization of the electronic devices 210, 220, 230, and 240 in the cluster 200 are based. The anchor master may be changed in accordance with the master preference of the electronic device.

According to an embodiment, the discovery window (or discovery interval) may be repeated in accordance with a predetermined interval, and in the discovery window each of the time/channel-synchronized electronic devices 210, 220, 230, and 240 may transmit and receive the beacons and the SDFs to and from the other electronic devices. According to an embodiment, the beacons may be periodically transmitted and received in each discovery window in order to continuously keep the time and channel synchronization of the electronic devices 210, 220, 230, and 240 in the cluster 200. According to an embodiment, the SDFs may be transmitted and received in the discovery window in accordance with the necessity to provide services with the discovered electronic devices 210, 220, 230, and 240. According to an embodiment, among the time/channel-synchronized electronic devices 210, 220, 230, and 240, the electronic device operating as the anchor master may transmit the beacons in an interval between the discovery windows to detect a new electronic device.

According to an embodiment, each of the electronic devices 210, 220, 230, and 240 in the cluster 200 may reduce current consumption by operating in an active state only during the discovery window and operating in a low-power state (e.g., sleep state) during the remaining intervals outside the discovery window. As such, the discovery window corresponds to a time (e.g., an interval measured in milliseconds) in which the electronic device is in the active state (or awake state) and is consuming power, whereas in the intervals outside the discovery window, the electronic device is in the sleep state where low-power discovery is possible. Accordingly, the electronic devices 210, 220, 230, and 240 in the cluster 200 may be simultaneously activated at a start time (e.g., DW start) of the discovery window synchronized through time synchronization, and they may be simultaneously switched to the sleep state at an end time (e.g., DW end) of the discovery window.

Figure 3:
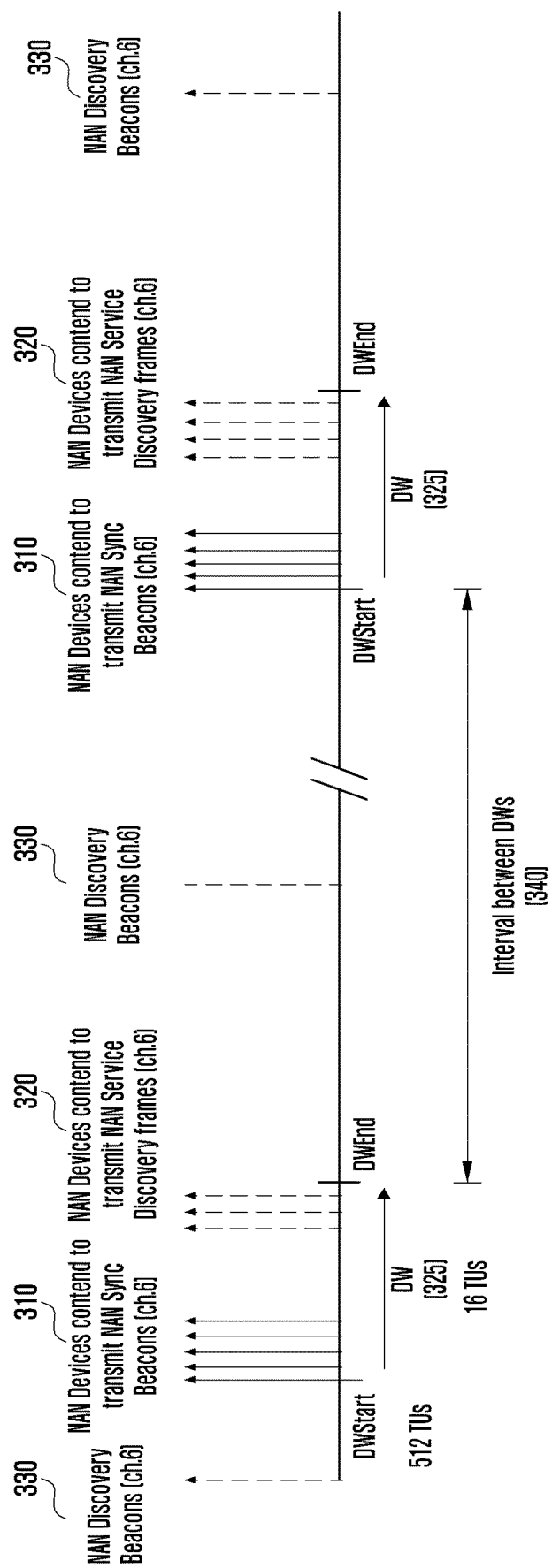
FIG. 3 is a diagram illustrating an example of a signal transmission protocol in a proximity network according to an embodiment.

According to an embodiment, the electronic devices 210, 220, 230, and 240 included in the cluster 200 may perform discovery, synchronization, and data exchange operations using a protocol illustrated in FIG. 3.

FIG. 3 is a diagram illustrating an example of a signal transmission protocol in a proximity network according to an embodiment.

For example, FIG. 3 may be an exemplary diagram of a discovery window according to an embodiment. In the example of FIG. 3, electronic devices included in one cluster may transmit signals through a specific channel (e.g., channel 6 (Ch 6)) based on NAN standards.

With reference to FIG. 3, electronic devices included in one cluster may transmit synchronization beacons 310 and SDFs 320 in a synchronized discovery window (DW) 325. At another interval 340 outside the discovery window 325 (e.g., interval between the discovery windows), discovery beacons 330 may be transmitted by at least one electronic device. According to an embodiment, the electronic devices may transmit the synchronization beacons 310 and the SDFs 320 based on contentions between the electronic devices. For example, one electronic device may contend to transmit its synchronization beacons 310 and SDFs 320 to another electronic device, and the other electronic device may receive the synchronization beacons 310 and SDFs 320 based on some priority.

According to an embodiment, for data exchange between the respective electronic devices, the discovery window 325 may be an interval at which the corresponding electronic device is activated from a sleep state that corresponds to a power saving mode to a wakeup state. For example, the discovery window 325 may be divided into time units (TUs) of a number of milliseconds. According to an embodiment, the discovery window 325 for transmitting and receiving the synchronization beacons 310 and the SDFs 320 may occupy 16 time units (TUs), and it may have a cycle (or interval) being repeated with 512 time units (TUs).

According to an embodiment, the discovery beacon 330 may be a signal that is transmitted so that other electronic devices that are unable to join the cluster can discover the cluster. For example, the discovery beacon 330 is a signal for notifying of the existence of the cluster, and the electronic devices that are not part of the cluster may discover and join the cluster by receiving the discovery beacons 330 through performing a passive scan.

According to an embodiment, the discovery beacon 330 may include information that is necessary for synchronization with the cluster. For example, the discovery beacon 330 may include at least one of a frame control (FC) field indicating the function of the discovery beacon signal, broadcast address, media access control (MAC) address of the electronic device where the beacon originated, cluster identifier (ID), sequence control field, time stamp for the beacon frame, beacon interval indicating the transmission interval of the discovery beacon 330, or capability information for the transmitting electronic device. According to an embodiment, the discovery beacon 330 may include an information element related to at least one proximity network (or cluster). In an embodiment, the information related to the proximity network may be called attribute information.

According to an embodiment, the synchronization beacon 310 may be a signal for keeping the synchronization between the synchronized electronic devices in the cluster. The synchronization beacon 310 may be transmitted by a synchronization device among the electronic devices in the cluster. For example, the synchronization device may be an anchor master device defined in the NAN standards, a master device, or a non-master sync device.

According to an embodiment, the synchronization beacon 310 may include information required for the synchronization of the electronic devices in the cluster. For example, the synchronization beacon 310 may include at least one of FC field indicating the function of the synchronization beacon signal, broadcast address, MAC address of the transmitting electronic device, cluster identifier, sequence control field, time stamp for the beacon frame, the beacon interval indicating the interval between start points of the discovery window 325, or capability information for the transmitting electronic device. According to an embodiment, the synchronization beacon 310 may include an information element related to at least one proximity network (or cluster). For example, the proximity network related information may include content for a service provided through the proximity network.

According to an embodiment, the SDF 320 may be signals for the exchange of data through the proximity network. According to an embodiment, the SDF 320 may be a vender specific public action frame, and it may include various fields. For example, the SDF 320 may include a category or an action field, and it may include at least one piece of proximity network related information.

As described above, the synchronization beacon 310, the SDF 320, and the discovery beacon 330 may include the proximity network related information. In an embodiment, the proximity network related information may include an identifier indicating the kind of information, the length of the information, and a body field containing the information. According to an embodiment, the information in the body field may include at least one of master indication information, cluster information, service identifier list information, service descriptor information, connection capability information, wireless LAN infrastructure information, peer-to-peer (P2P) operation information, independent basic service set (IBSS) information, mesh information, further proximity network service discovery information, further availability map information, country code information, ranging information, cluster discovery information, or vender specific information.

Figure 4:
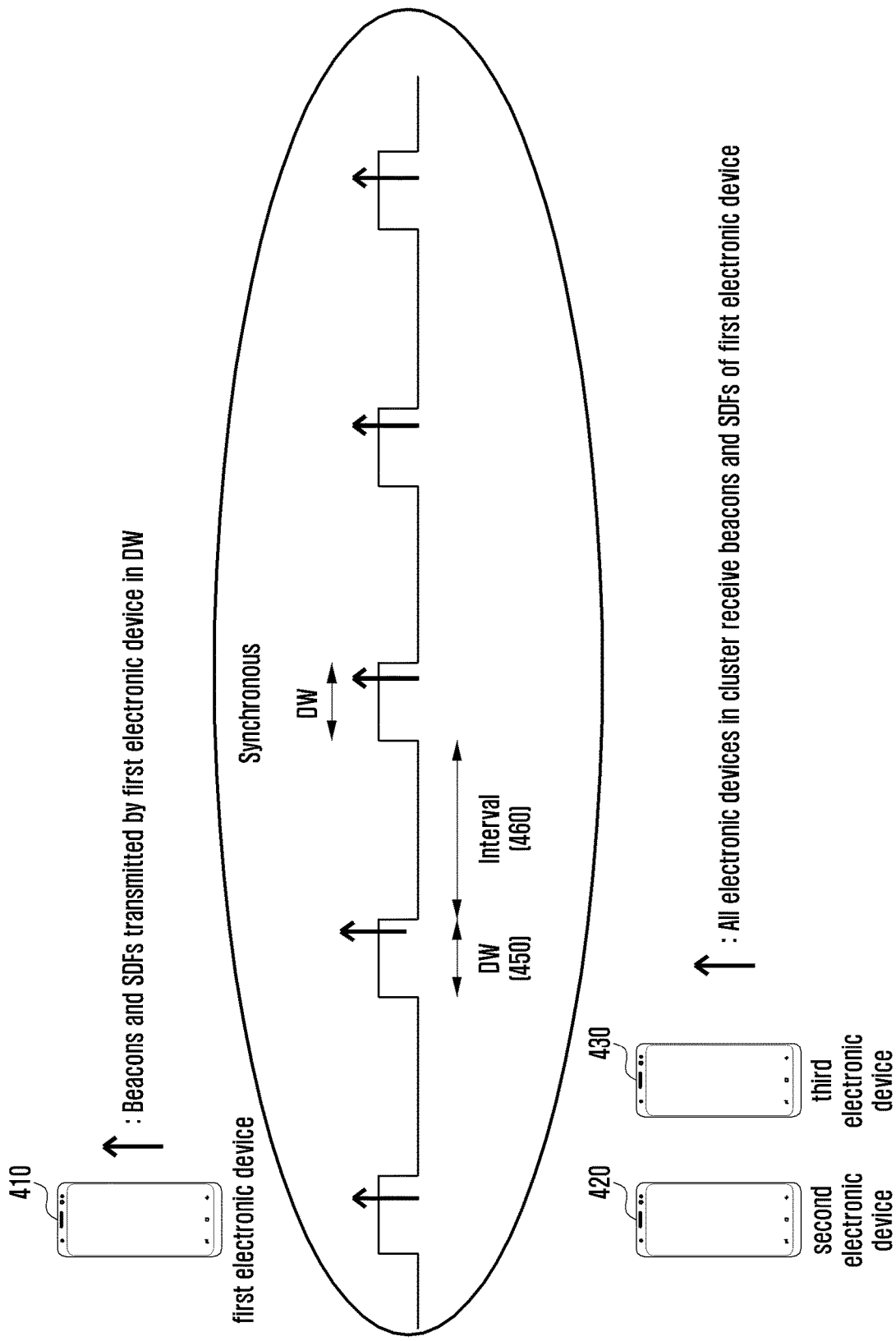
FIG. 4 is a diagram illustrating an example of data transmission and reception in a cluster according to an embodiment.

FIG. 4 is a diagram illustrating an example of data transmission and reception in a cluster according to an embodiment.

For example, FIG. 4 shows an example in which a first electronic device 410, a second electronic device 420, and a third electronic device 430 form one cluster through near field communication technology, and the electronic devices 410, 420, and 430 may transmit and receive beacons and/or SDFs to and from each other. According to an embodiment, in the example shown in FIG. 4, the first electronic device 410 serves as the master electronic device.

With reference to FIG. 4, the first electronic device 410 may transmit beacons and SDFs in the discovery window 450. According to an embodiment, the first electronic device 410 may broadcast the beacons and SDFs in each discovery window 450 being repeated at each predetermined interval (e.g., interval 460).

According to an embodiment, the second electronic device 420 and the third electronic device 430 may receive the beacons and the SDFs transmitted by the first electronic device 410. According to an embodiment, the second electronic device 420 and the third electronic device 430 may receive the beacons and the SDFs being broadcasted from the first electronic device 410 in each discovery window 450.

According to an embodiment, the beacon being transmitted in the discovery window 450 may be the synchronization beacon, and it may include information for keeping the synchronization between the electronic devices 410, 420, and 430. For example, if the electronic devices 410, 420, and 430 are included in the cluster, all three device may be synchronized with the time clock of the master electronic device (e.g., first electronic device 410), and thus the discovery window 450 may be activated at the same time.

According to an embodiment, at an interval (e.g., interval 460) outside the discovery window 450, the electronic devices 410, 420, and 430 may be kept in the sleep state in order to reduce current consumption. Thus, the electronic devices 410, 420, and 430 can reduce current consumption by operating in the awake state only during the discovery window 450.

According to certain embodiments, method and apparatus are disclosed to further improve current consumption of NAN devices based low-power near field communication technology (or NAN standards). For example, in the NAN, a NAN service discovery proxy (hereinafter referred to as "service discovery proxy") function for reducing current consumption by controlling traffic load distribution is defined, and an electronic device (or proxy device) can operate (or function) as a NAN proxy server (hereinafter referred to as "proxy server") or a NAN proxy client (hereinafter referred to as "proxy client"). According to an embodiment, in the cluster, any one electronic device may operate as a proxy server, and other electronic devices may operate as a proxy clients.

According to an embodiment, the electronic devices in the cluster may be synchronized with the same discovery window, a proxy server negotiation may be performed between the electronic devices, and each of the electronic devices operates may be assigned roles as the proxy server and proxy clients based on the proxy server negotiation. According to an embodiment, the electronic device designated as the proxy server may perform data communication (e.g., service discovery) in place of the proxy clients, and thus the current consumption of the proxy client can be reduced. According to an embodiment, an electronic device can support functions (or roles or operations) of both the proxy server and the proxy client, and it can dynamically switch or simultaneously perform such functions to further improve current consumption.

Figure 5:
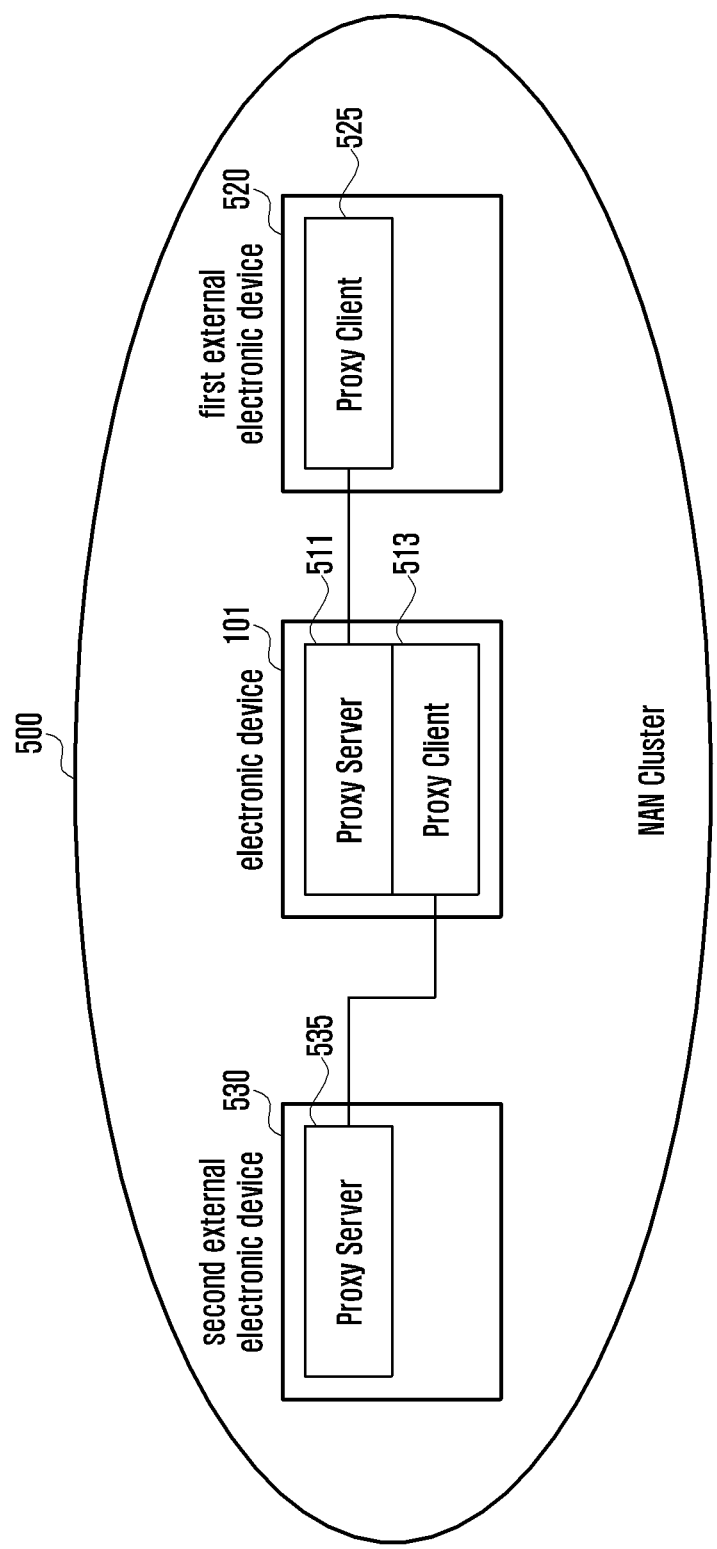
FIG. 5 is a diagram illustrating an example in which an electronic device according to an embodiment is a proxy server and a proxy client at the same time.

FIG. 5 is a diagram illustrating an example in which an electronic device according to an embodiment is a proxy server and a proxy client at the same time.

As illustrated in the example of FIG. 5, an electronic device 101, a first external electronic device 520, and a second external electronic device 530 are included in a cluster 500. According to an embodiment, the electronic device 101 supports both functions of a proxy server 511 and a proxy client 513, the first external electronic device 520 operates as a proxy client 525, and the second external electronic device 530 operates as a proxy server 535.

According to an embodiment, if the electronic device 101 (e.g., mobile device) operates to establish a network connection with the first external electronic device 520 (e.g., IoT device or wearable device), the electronic device 101 may operate as the proxy server 511. According to an embodiment, the first external electronic device 520 that is more sensitive to the current consumption than the electronic device 101 may register service information and awake interval information in the electronic device 101, and it may operate as the proxy client 525.

According to an embodiment, the electronic device 101 may recognize, through the service discovery, that a new proxy server (e.g., second external electronic device 530) is nearby. According to an embodiment, the electronic device (e.g., second external electronic device 530) operating as the new proxy server 535 in the cluster 500 may be a fixed type electronic device to which a power is always supplied, such as an access point (AP), a hub, an artificial intelligence (AI) device (e.g., AI speaker), or a TV. In such a scenario, in order to reduce current consumption, the electronic device 101 may also be registered as the proxy client 513 in the second external electronic device 530 (e.g., proxy server 535), and thus current consumption in the electronic device 101 may be reduced.

According to an embodiment, in the situation of the cluster 500 shown in FIG. 5, the electronic device 101 may support a dual mode in which the electronic device 101 operates as the proxy server 511 with respect to the first external electronic device 520 to manage the first external electronic device 520 registered as the proxy client 525, and in order to minimize current consumption, the electronic device 101 is also registered as the proxy client 513 in the second external electronic device 530 that operates as the proxy server 535.

With reference to FIG. 5, the electronic device 101 may use a service discovery proxy function with the first external electronic device 520. According to an embodiment, as the proxy server 511, the electronic device 101 may register and manage service information and awake interval information of the first external electronic device 520. Although one proxy client is illustrated in FIG. 5, the disclosed embodiments are not so limited, and the electronic device 101 may register and manage several proxy clients.

According to an embodiment, in the situation shown in FIG. 5, the electronic device 101 may include information of the first external electronic device 520 in the discovery window, and it may perform a service discovery operation (e.g., SDF (e.g., publish, subscribe, or follow-up message) exchange). According to an embodiment, in the service discovery operation, the electronic device 101 may receive the SDF (e.g., publish message) that is sent by the second external electronic device 530, and it may identify that the second external electronic device 530 operates as the proxy server 535.

According to an embodiment, the electronic device 101 may perform a dual mode in which the electronic device 101 performs the function of the proxy server 511 with respect to the first external electronic device 520, and it operates as the proxy client 513 with respect to the second external electronic device 530 at the same time. The electronic device 101 may transmit service information and awake interval information to the second external electronic device 530. According to an embodiment, the service information that the electronic device 101 registers in the second external electronic device 530 may include, for example, both the service information (e.g., first service information) of the electronic device 101 and the service information (e.g., second service information) registered by the first external electronic device 520 that operates as the proxy client 525 with respect to the electronic device 101.

According to an embodiment, the second external electronic device 530 may use the service information (e.g., first service information and second service information) from the electronic device 101 and/or the first external electronic device 520 during the service discovery operation.

According to an embodiment, the awake interval information (e.g., first awake interval information) registered by the electronic device 101 to reduce current consumption should not be larger than the awake interval information (e.g., second awake interval information) of the first external electronic device 520 that is managed by the electronic device 101 itself, but may be configured to have the interval that is smaller than or equal to the second awake interval information (e.g., first awake interval second awake interval). For example, the electronic device 101 may configure the awake interval (e.g., first awake interval) of the electronic device 101 in consideration of the awake interval (e.g., second awake interval) of the first external electronic device 520.

According to an embodiment, the electronic device 101 can reduce current consumption more efficiently by dynamically switching between proxy server and proxy client depending on the service discovery proxy function. For example, in an embodiment, the electronic device 101 may operate as the proxy server and the proxy client at the same time, or it may dynamically be configured as the proxy server and the proxy client. Hereinafter, according to certain embodiments, the operation of the electronic device 101 to reduce current consumption based on the dual mode operation of the proxy server and the proxy client will be described in more detail with reference to the drawings to be described later.

The electronic device 101 according to an embodiment of the disclosure may include a housing; at least one antenna; at least one wireless communication circuitry (e.g., wireless communication module 192 of FIG. 1) located in the housing, operatively connected to the antenna, and configured to support a neighbor awareness networking (NAN) protocol; a processor (e.g., processor 120 of FIG. 1) located in the housing and operatively connected to the wireless communication circuitry; and a memory (e.g., memory 130 of FIG. 1) operatively connected to the processor 120, wherein the memory 130 stores instructions that, when being executed, cause the processor to: broadcast a first signal notifying that the electronic device 101 (e.g., electronic device 101 of FIG. 5) can operate as a first proxy server through the wireless communication circuitry, receive a second signal including a first proxy client registration request from a first external electronic device (e.g., first external electronic device 520 of FIG. 5), transmit a third signal including a first proxy client registration response to the first external electronic device in response to the second signal, receive a fourth signal notifying that a second external electronic device (e.g., second external electronic device 530 of FIG. 5) can operate as a second proxy server from the second external electronic device through the wireless communication circuitry while operating as the first proxy server of the first external electronic device, transmit a fifth signal including a second proxy client registration request to the second external electronic device based on the fourth signal, receive a sixth signal including a second proxy client registration response corresponding to the fifth signal from the second external electronic device, and operate the electronic device as a first proxy client of the second external electronic device in parallel with operating the electronic device as the first proxy server of the first external electronic device.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the first signal may include proxy server capability information of the electronic device 101 and/or discovery window (DW) awake interval information.

According to an embodiment, the second signal may include discovery window awake interval information of the first external electronic device.

According to an embodiment, the fifth signal may include the discovery window awake interval information of the electronic device 101, and the discovery window awake interval information of the electronic device 101 may be based at least on discovery window awake interval information of the first external electronic device.

According to an embodiment, the fifth signal may include first discovery window awake interval information of the electronic device 101 and second discovery window awake interval information of the first external electronic device registered as a second proxy client of the electronic device 101.

According to an embodiment, the first discovery window awake interval information of the electronic device 101 may be configured as an interval that is smaller than or equal to the second discovery window awake interval information of the first external electronic device.

According to an embodiment, the instructions may cause the processor 120 to: transmit, to the first external electronic device, a proxy server indication including an address and/or discovery window awake interval information of the second external electronic device through service discovery frame (SDF) information received from the second external electronic device, and, based on the proxy server indication, maintain the first external electronic device as a second proxy client of the electronic device 101 or cause the first external electronic device to end as the second proxy client with the electronic device 101 and to operate as a third proxy client of the second external electronic device.

According to an embodiment, the instructions may cause the processor to, when the electronic device deviates from an area of the second external electronic device by a predetermined amount, end the electronic device as the first proxy client of the second external electronic device and maintain the electronic device as the first proxy server of the first external electronic device.

The electronic device 101 according to an embodiment may include a housing; at least one antenna; at least one wireless communication circuitry (e.g., wireless communication module 192 of FIG. 1) located in the housing, operatively connected to the antenna, and configured to support communication at a discovery window (DW) awake interval synchronized with an external electronic device in a same neighbor awareness networking (NAN) cluster based on a NAN protocol; a processor (e.g., processor 120 of FIG. 1) located in the housing and operatively connected to the wireless communication circuitry; and a memory (e.g., memory 130 of FIG. 1) operatively connected to the processor 120, wherein the memory 130 stores instructions that, when being executed, cause the processor 120 to: perform a service discovery at the discovery window awake interval through the wireless communication circuitry, receive a first signal notifying that the external electronic device (e.g., second electronic device 1020 of FIG. 10) can operate as a proxy server from the external electronic device, perform a proxy server negotiation with the external electronic device based on the received first signal, and operate the electronic device 101 (e.g., first electronic device 1010 of FIG. 10) as the proxy server of the external electronic device or operate the electronic device 101*e* as a proxy client of the external electronic device based on the performed proxy server negotiation.

According to an embodiment, the first signal may include proxy server capability information and/or service information of the external electronic device.

According to an embodiment, the proxy server negotiation may include exchange of a proxy server intent, a discovery window awake interval, the number of registrable clients, an expiration time, and/or device type information.

According to an embodiment, the instructions may cause the processor 120 to transmit proxy registration request information including service information and/or the discovery window awake interval of the electronic device 101 to the external electronic device when the electronic device 101 is to be operated as the proxy client.

According to an embodiment, the instructions may cause the processor 120 to configure an expiration time of the proxy server and to perform the service discovery based on the discovery window awake interval and/or service information of the electronic device 101 and the external electronic device when the electronic device 101 is to be operated as the proxy server.

Figure 6:
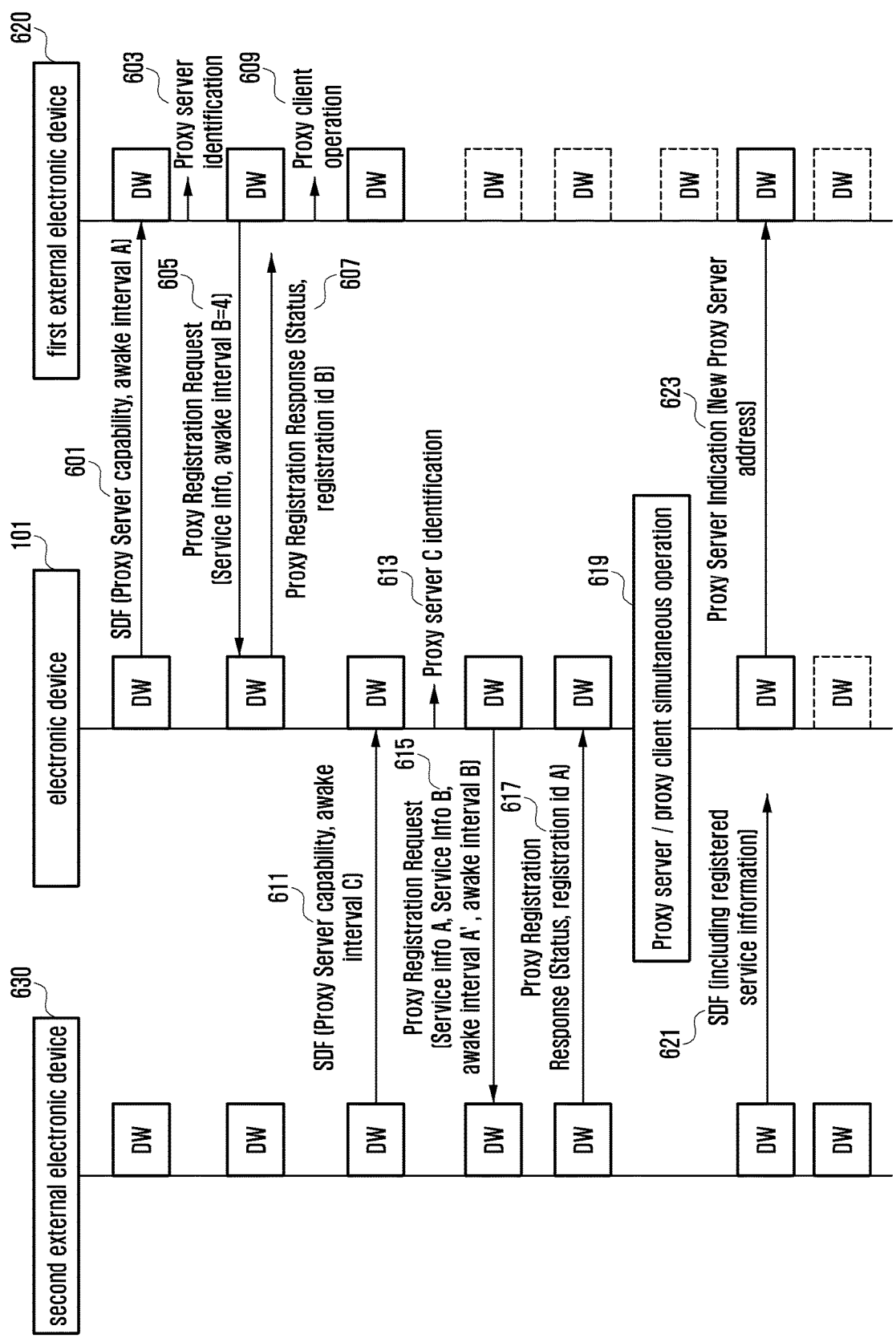
FIG. 6 is a diagram illustrating an operation method in which an electronic device according to an embodiment is a proxy server and a proxy client at the same time.

FIG. 6 is a diagram illustrating an operation method in which an electronic device according to an embodiment is a proxy server and a proxy client at the same time.

According to an embodiment, FIG. 6 may show an example of an operation method of a dual mode in which the electronic device 101 is both the proxy server and the proxy client at the same time as alluded to above with reference to FIG. 5.

According to an embodiment, the electronic device 101 supporting both functions of the proxy server and the proxy client may perform a procedure of registering a first external electronic device 620 as a proxy client when it operates as the proxy server, and the electronic device 101 may manage service information registered by the first external electronic device 620. Although not illustrated in FIG. 6, the electronic device 101 may register and manage one or more proxy clients in accordance with the capability of the electronic device 101.

With reference to FIG. 6, at operation 601, the electronic device 101 (e.g., mobile device) may transmit information indicating whether to support the proxy server function in a SDF (e.g., publish message) during a discovery window interval. According to an embodiment, the information indicating whether to support the proxy server function may include proxy server capability information and awake interval information (e.g., discovery window (DW) awake interval). According to an embodiment, as exemplified in FIG. 6, during the initial operation, the electronic device 101, the first external electronic device 620, and a second external electronic device 630 may wake up once in each of their discovery windows (e.g., waking up when awake interval A of the electronic device 101=1, awake interval B of the first external electronic device 620=1) to perform a service discovery. For example, the electronic devices (e.g., the electronic device 101, the first external electronic device 620, and the second external electronic device 630) in a cluster may be synchronized with the same discovery window. According to an embodiment, as exemplified in FIG. 6, when the second external electronic device 620 operates as the proxy client of the electronic device 101, the second external electronic device 620 may reconfigure its awake interval to "4" (e.g., awake interval B=1→awake interval B=4) so as to wake up once for every four discovery windows.

At operation 603, in the cluster, an external electronic device or neighboring NAN device (e.g., first external electronic device 620) that is synchronized with the electronic device 101 in the same discovery window may receive the SDF (e.g., publish message) being broadcasted by the electronic device 101, and it may identify whether the electronic device 1010 supports the proxy server function. According to an embodiment, the first external electronic device 620 may be a device (e.g., IoT device or wearable device) that is sensitive to current consumption, i.e. it has a relatively small battery.

At operation 605, the first external electronic device 620 may identify that the electronic device 101 supports the proxy server function, and it may transmit a request message (e.g., proxy registration request message) for requesting the proxy registration to the electronic device 101 performing the proxy server function. According to an embodiment, the request message may include service information and awake interval information (e.g., awake interval B=4) of the first external electronic device 620. According to an embodiment, the first external electronic device 620 may adjust the awake interval to be provided to the electronic device 101 in order to reduce the current consumption when it operates as the proxy client. According to an embodiment, when operating as the proxy client, the first external electronic device 620 may extend (or reconfigure) the currently configured awake interval (e.g., awake interval B=1), and it may reduce current consumption while operating as the proxy client.

At operation 607, the electronic device 101 may transmit a response message (e.g., proxy registration response message) regarding whether to register the proxy of the first external electronic device 620 to the first external electronic device 620 in response to the proxy registration request from the first external electronic device 620. According to an embodiment, the response message may include information (e.g., status) regarding acceptance or rejection with respect to the proxy registration request from the first external electronic device 620. According to an embodiment, if the electronic device 101 accepts the proxy registration request from the first external electronic device 620, the response message may include registration information (e.g., registration ID information (e.g., registration id B)) given (or allocated) to the first external electronic device 620 by the electronic device 101.

At operation 609, if the proxy registration request is accepted by the electronic device 101, the first external electronic device 620 may operate as the proxy client. According to an embodiment, the first external electronic device 620 may reduce current consumption by performing an awake operation once for every four discovery windows based on the awake interval (e.g., awake interval=4) requested by the first external electronic device 620 itself. According to an embodiment, the electronic device 101 may wake up in every discovery window (e.g., awake interval A=1) to perform service discovery. According to an embodiment, the electronic device 101 may manage the first external electronic device 620 as the proxy client, and it may perform the service discovery in place of the first external electronic device 620.

At operation 611, the second external electronic device 630 performing the proxy server function in the cluster may broadcast the SDF (e.g., publish message) at a discovery window interval (e.g., awake interval C=1). According to an embodiment, the second external electronic device 630 may include information including whether to support the proxy server function (e.g., proxy server capability information or awake interval information) in the SDF to be transmitted. According to an embodiment, through service discovery in the cluster 500, the electronic device 101 may recognize that a new proxy server (e.g., second external electronic device 630) that is not the electronic device 101 itself is around the electronic device 101. According to an embodiment, as exemplified in FIG. 6, the second external electronic device 630 may be a fixed type device to which a power is always supplied. In order to reduce current consumption, the electronic device 101 may also be registered as the proxy client in the second external electronic device 630, to which a regular power is supplied, and thus the awake interval can be extended in the second external electronic device 630 and current consumption can be reduced in the electronic device 101. According to an embodiment, the electronic device 101 and the second external electronic device 630 may recognize each other by performing service discovery between the two electronic devices in the same cluster. For example, the electronic device 101 may determine whether a new proxy server (e.g., second external electronic device 630) is discovered in the cluster while performing the service discovery. According to an embodiment, in the case where the electronic device 101 and the first external electronic device 620 move to the cluster in which the second external electronic device 630 is included, the electronic device 101, the first external electronic device 620, and the second external electronic device 630 may be included in the same cluster.

At operation 613, the electronic device 101 may receive the SDF transmitted by the second external electronic device 630, and it may identify that the second external electronic device 630 operates as the proxy server. According to an embodiment, the electronic device 101 may identify device type information of the second external electronic device 630. For example, the electronic device 101 may identify whether the second external electronic device 630 is a kind of a device to which the power is always supplied, such as the aforementioned AP, hub, etc.

At operation 615, if the second external electronic device 630 is the proxy server, the electronic device 101 may transmit, to the second external electronic device 630, a proxy registration request message for requesting the proxy registration of the electronic device 101 like the above-described operation in which the first external electronic device 620 requests the proxy registration. According to an embodiment, the proxy registration request message that the electronic device 101 requests from the second external electronic device 630 may include service information (e.g., first service information (e.g., service info A)) and awake interval information (e.g., first awake interval information (e.g., awake interval A')) of the electronic device 101, and service information (e.g., second service information (e.g., service info B)) and awake interval information (e.g., second awake interval information (e.g., awake interval B)) of the first external electronic device 620 that the electronic device 101 manages as the proxy client. According to an embodiment, the awake interval information of the electronic device 101 may be configured to have a value (or interval) that is smaller than or equal to the value of the awake interval information of the first external electronic device 620.

According to various embodiments, the awake interval information (e.g., awake interval A') of the electronic device 101 that the electronic device 101 registers in the second external electronic device 630 should not be larger than the awake interval information (e.g., awake interval B=4) of the first external electronic device 620 that is managed by the electronic device 101. Rather, it may be configured to have the interval that is smaller than or equal to the first external electronic device 620 (e.g., first awake interval second awake interval). For example, the electronic device 101 may configure the awake interval (e.g., awake interval A') to be "2" (e.g., awake interval A'=2), which is equal to or smaller than "4" of the awake interval of the first external electronic device 560 (e.g., awake interval B=4).

At operation 617, the second external electronic device 630 may transmit a proxy registration response message to the electronic device 101 in response to the proxy registration request from the electronic device 101. According to an embodiment, the proxy registration response message may include information (e.g., status) regarding acceptance or rejection with respect to the proxy registration request from the electronic device 101. According to an embodiment, if the second external electronic device 630 accepts the proxy registration request from the electronic device 101, the response message may include registration information (e.g., registration ID information (e.g., registration id A)) given (or allocated) to the electronic device 101 by the second external electronic device 630.

According to an embodiment, through exchanging of the proxy registration request and the proxy registration response with the second external electronic device 630, the electronic device 101 may be registered in the second external electronic device 630 as the proxy client. According to an embodiment, as shown at operation 619, through exchanging of the proxy registration request and the proxy registration response with the second external electronic device 630, the electronic device 101 may operate as the proxy client with respect to the second external electronic device 630 while operating as the proxy server with respect to the first external electronic device 620. For example, the electronic device 101 may operate as the proxy server and the proxy client at the same time.

In an embodiment, the proxy registration request message and the proxy registration response message may use the SDF, or they may use a separate NAN action frame (NAF).

According to an embodiment, when registering information (e.g., service information and awake interval information) in the second external electronic device 630 at operation 615, the electronic device 101 may also register service information of the proxy client (e.g., first external electronic device 620) being managed by the electronic device 101 through the proxy server operation. According to an embodiment, the service information that the electronic device 101 registers in the second external electronic device 630 may include both the service information (e.g., first service information) of the electronic device 101 and the service information (e.g., second service information) registered by the first external electronic device 620 that operates as the proxy client in the electronic device 101.

According to an embodiment, in the case of extending (or configuring) the awake interval (e.g., first awake interval) for the electronic device 101 to operate as the proxy client of the second external electronic device 630, the electronic device 101 may configure the awake interval that is smaller than or equal to the second awake interval with reference to the awake interval (e.g., second awake interval) of the proxy client (e.g., first external electronic device 620) of the electronic device 101.

For example, the electronic device 101 may perform service discovery with the second external electronic device 630 during the discovery window for the second external electronic device 630, and if service information related to the first external electronic device 620 is required, it is necessary for the electronic device 101 to transfer the corresponding information to the first external electronic device 630. And if the service information acquired from the second external electronic device 630 is the service information registered by the first external electronic device 620, the electronic device 101 may transfer the corresponding result at a discovery window interval when the first external electronic device 620 is awake. In this case, if the electronic device 101 has the awake interval that is larger than the awake interval of the first external electronic device 620, a delay may occur in transferring the corresponding service information to the first external electronic device 620, which causes inefficiency in transferring the service information. Thus, according to certain embodiments, with reference to the awake intervals of the registered proxy clients, the electronic device 101 may operate to register, in the second external electronic device 630, the awake interval that is smaller than or equal to the smallest awake interval of the proxy clients under control of the electronic device 101.

According to an embodiment, the electronic device 101 may transmit a message (e.g., proxy server indication message) including information (e.g., address information and awake interval information) related to the second external electronic device 630 to the first external electronic device 620. In certain embodiments, the proxy server indication message may use the SDF, or it may use a new NAF.

According to an embodiment, as shown at operation 621 of FIG. 6, the second external electronic device 630 may transfer the SDF including the service information registered in the second external electronic device 630 to the electronic device 101. According to an embodiment, as shown at operation 623 of FIG. 6, the electronic device 101 may transfer, to the first external electronic device 620, the proxy server indication message (e.g., including address information of the second external electronic device 630 that is the new proxy server) based on the SDF received from the second external electronic device 630.

According to an embodiment, if the proxy server indication message is received from the electronic device 101, the first external electronic device 620 may keep the electronic device 101 as its proxy server, or the first external electronic device 620 may end the proxy client function with the electronic device 101 and it may be registered as a new proxy client in the second external electronic device 630.

According to an embodiment, as shown in FIG. 6, the electronic device 101 may manage and operate the first external electronic device 620 as the proxy client (e.g., perform proxy server function for the first external electronic device 620), and it may operate as the proxy client of the second external electronic device 630 so as to reduce its current consumption in the same way the first external electronic device 620 reduces its current consumption. According to an embodiment, if the electronic device 101 and the first external electronic device 620 move and get out of an area (e.g., cluster) of the second external electronic device 630, the electronic device 101 may remove (or end) the proxy client function with the second external electronic device 630, and they may keep the proxy server operation for the first external electronic device 620. Thus, the electronic device 101 may work to reduce the current consumption of the first external electronic device 620, and it may operate as a proxy client at the same time depending on the situation, so that its own current consumption can be reduced.

Figure 7:
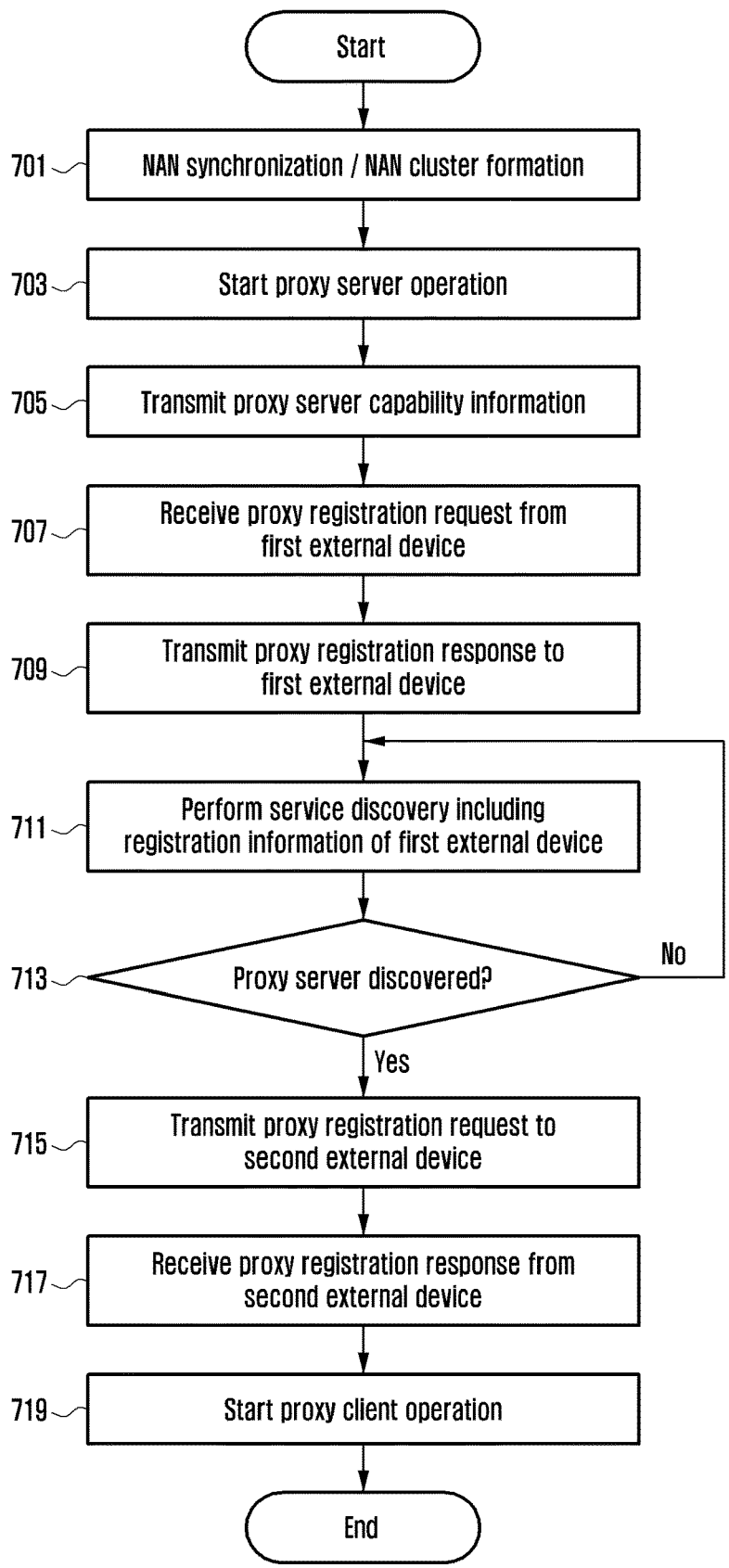
FIG. 7 is a flowchart illustrating an operation method of an electronic device according to an embodiment.

FIG. 7 is a flowchart illustrating an operation method of an electronic device according to an embodiment.

In an embodiment, FIG. 7 may show an exemplary case in which an electronic device 101 supports functions of both a proxy server and a proxy client, and the electronic device 101 functions as the proxy server and the proxy client at the same time.

With reference to FIG. 7, at operation 701, a processor 120 of the electronic device 101 may activate a NAN function, and it may be synchronized with neighboring electronic devices having NAN functions (e.g., NAN devices) to form a NAN cluster.

At operation 703, the processor 120 may activate the proxy server function of the electronic device 101, and it may start the proxy server operation.

At operation 705, the processor 120 may transmit proxy server capability information notifying that the electronic device 101 supports the proxy server operation through a SDF (e.g., publish, subscribe, or follow-up message).

At operation 707, the processor 120 may receive a proxy registration request message for requesting proxy registration from a neighboring first external electronic device (e.g., first external electronic device 520 or 620 of FIG. 5 or 6). According to an embodiment, the proxy registration request message that is transmitted by the first external electronic device may include awake interval information and service information of the first external electronic device.

At operation 709, the processor 120 may transmit a proxy registration response message corresponding to the proxy registration request message to the first external electronic device.

At operation 711, the processor 120 may perform a service discovery that includes registration information of the first external electronic device. According to an embodiment, based on the proxy registration response message, the processor 120 may manage the first external electronic device as the proxy client, and it may perform service discovery in place of the first external electronic device.

At operation 713, the processor 120 may determine whether a new proxy server is discovered in the cluster while performing the service discovery. For example, the processor 120 may identify that a second external electronic device supports the proxy server function from the SDF of the second external electronic device (e.g., second external electronic device 530 or 630 of FIG. 5 or FIG. 6) received through a discovery window.

At operation 713, if the proxy server is not discovered (e.g., answer No at operation 713), the processor 120 may proceed with operation 711 to perform operations subsequent to operation 711.

At operation 713, if the proxy server is discovered (e.g., answer Yes at operation 713), the processor 120, at operation 715, may transmit the proxy registration request message for requesting proxy registration to the second external electronic device. According to an embodiment, the proxy registration request message that is transmitted by the electronic device 101 may include awake interval information and service information registered by the first external electronic device together with awake interval information and service information of the electronic device 101. According to an embodiment, the awake interval information of the electronic device 101 (e.g., first awake interval) may be configured as an interval that is smaller (shorter) than or equal to the second awake interval (e.g., first awake interval second awake interval) of the first external electronic device.

At operation 717, the processor 120 may receive the proxy registration response message from the second external electronic device.

At operation 719, the processor 120 may operate as a proxy client of the second external electronic device after the reception of the proxy response message from the second external electronic device. According to an embodiment, the processor 120 may start a dual mode operation of the proxy server and the proxy client of the electronic device 101. For example, the processor 120 may perform the operation of the proxy client for the second external electronic device simultaneously with keeping the operation of the proxy server for the first external electronic device.

Figure 8:
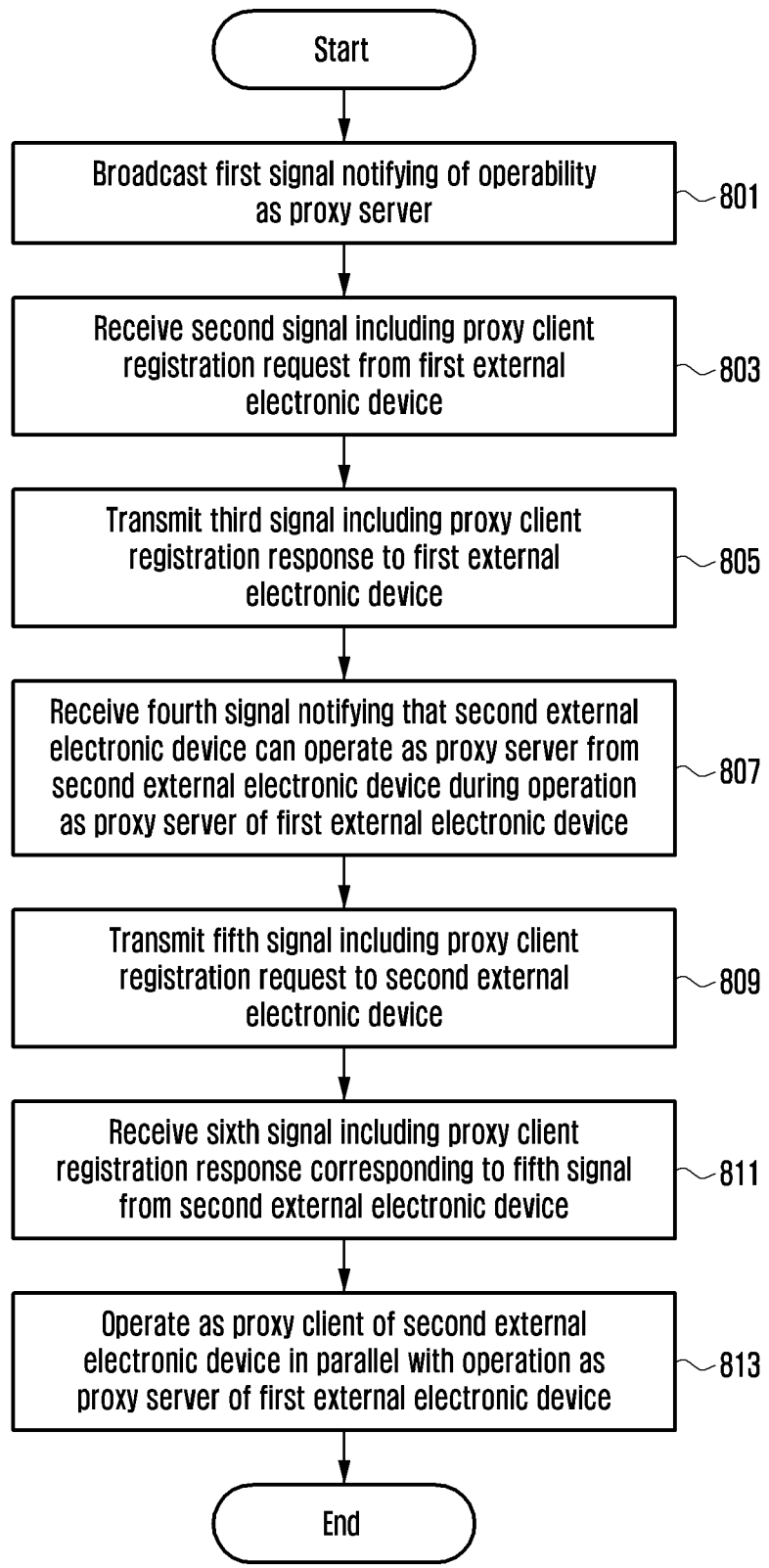
FIG. 8 is a flowchart illustrating an operation method of an electronic device according to an embodiment.

FIG. 8 is a flowchart illustrating an operation method of an electronic device according to an embodiment.

For example, FIG. 8 may show an example of a dual mode in which an electronic device 101 supports functions of both a proxy server and a proxy client, and the electronic device 101 operates as the proxy server and the proxy client at the same time.

With reference to FIG. 8, at operation 801, a processor 120 of the electronic device 101 may broadcast a first signal notifying that the electronic device 101 can operate as the proxy server. According to an embodiment, the processor 120 may broadcast the first signal notifying to neighboring external electronic devices in the cluster through a wireless communication circuitry of the electronic device 101 (e.g., wireless communication module 192 of FIG. 1). According to an embodiment, the wireless communication circuitry may be located in the housing of the electronic device 101, may be electrically connected to an antenna, and may be configured to support a NAN protocol. According to an embodiment, the first signal may include proxy server capability information and/or discovery window (DW) awake interval information of the electronic device 101.

At operation 803, the processor 120 may receive a second signal including a proxy client registration request from a first external electronic device (e.g., first external electronic device 520 or 620 of FIG. 5 or FIG. 6). According to an embodiment, the second signal may include discovery window awake interval information of the first external electronic device.

At operation 805, the processor 120 may transmit a third signal including a proxy client registration response to the first external electronic device in response to the second signal.

At operation 807, the processor 120 may receive a fourth signal notifying that a second external electronic device (e.g., second external electronic device 530 or 630 of FIG. 5 or FIG. 6) can operate as a proxy server from the second external electronic device while operating as a proxy server of the first external electronic device.

At operation 809, the processor 120 may transmit a fifth signal including a proxy client registration request to the second external electronic device based on the fourth signal. According to an embodiment, the fifth signal may include discovery window awake interval information of the electronic device 101 that is at least based on discovery window awake interval information of the first external electronic device.

At operation 811, the processor 120 may receive a sixth signal including a proxy client registration response corresponding to the fifth signal from the second external electronic device. According to an embodiment, the processor 120 may transmit a seventh signal (e.g., proxy server indication message) including an address of the second external electronic device and/or discovery window awake interval information to the first external electronic device corresponding to the reception of the sixth signal.

At operation 813, the processor 120 may operate as a proxy client of the second external electronic device in parallel with the operation of the electronic device 101 as the proxy server of the first external electronic device.

According to certain embodiments, the electronic device 101 may operate to select the functions of the proxy server and the proxy client. For example, the electronic device 101 may dynamically select the functions of the proxy server and the proxy client. According to an embodiment, in the case of a mobile device with a battery, it may be difficult to maintain its status as the proxy server due to limited resources, such as power. According to certain embodiments, it may be possible to negotiate the proxy server function between electronic devices (e.g., mobile devices) with limited power, and an electronic device may operate as the proxy server and the proxy client in a predetermined time interval that eventually will expire. For example, in the case of NAN, the same service information may be transmitted and received through SDF. In this case, it may be inefficient that all electronic devices wake up in every discovery window to perform the service discovery. According to certain embodiments, in such a situation, current consumption can be reduced by dynamically determining the proxy server between the electronic devices and registering information of neighboring proxy clients having the same service information in the cluster. Hereinafter, an operation for dynamic NAN service discovery proxy server configuration according to an embodiment will be described.

Figure 9:
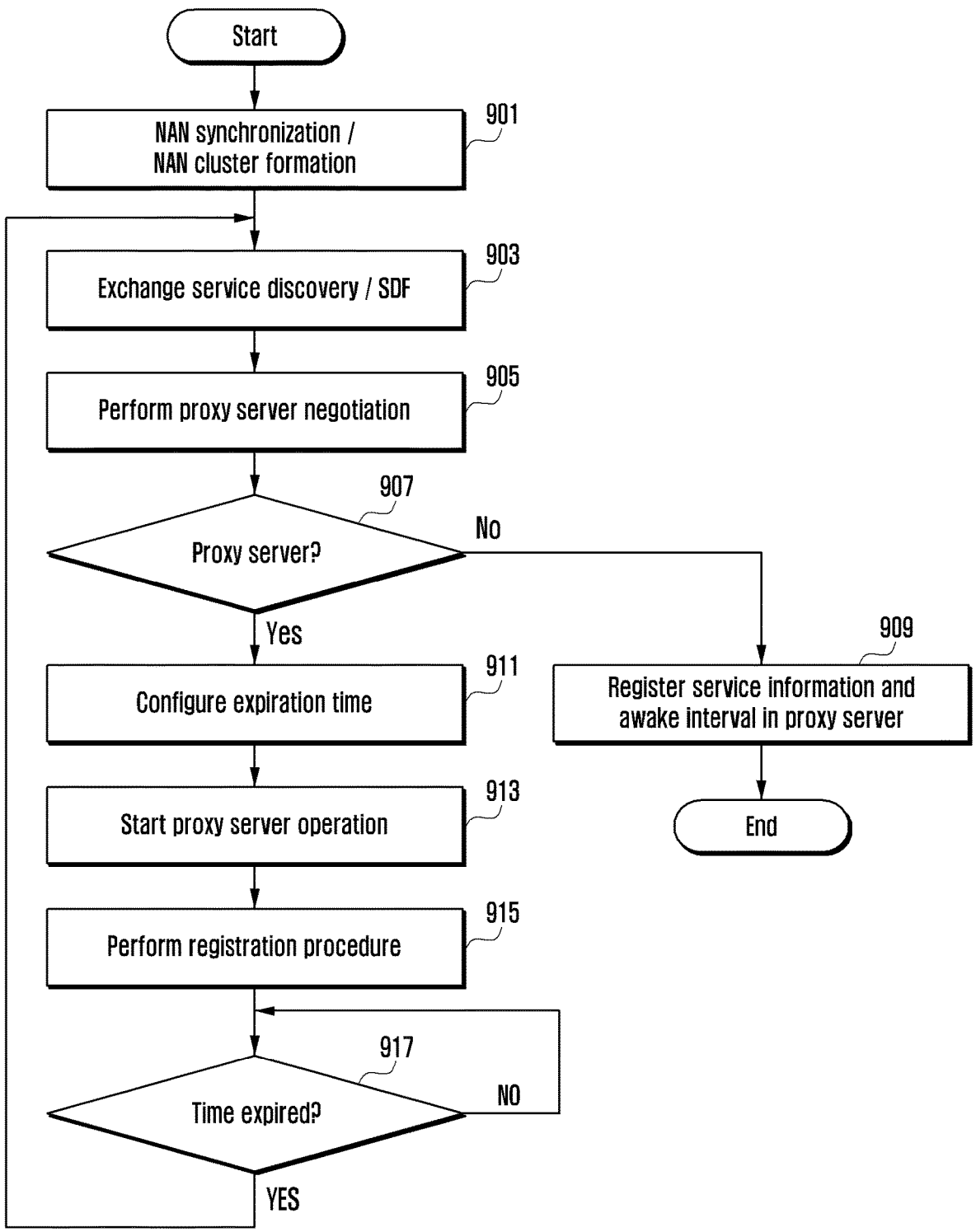
FIG. 9 is a flowchart illustrating an operation method of an electronic device according to an embodiment.

FIG. 9 is a flowchart illustrating an operation method of an electronic device according to an embodiment.

For example, FIG. 9 may show an operation example in which an electronic device 101 dynamically performs NAN service discovery proxy server configuration.

With reference to FIG. 9, at operation 901, a processor 120 of the electronic device 101 may activate a NAN function, and it may form a NAN cluster with neighboring external electronic devices having NAN functions (e.g., NAN devices) through a NAN synchronization process.

At operation 903, the processor 120 may perform a service discovery exchange (e.g., SDF (e.g., publish, subscribe, or follow-up message)) in a discovery window that is synchronized with external electronic devices in the same NAN cluster. According to an embodiment, the electronic devices (e.g., electronic device 101 and external electronic devices) in the same NAN cluster may be synchronized with the same discovery window.

At operation 905, the processor 120 may perform a proxy server negotiation with the external electronic devices. According to an embodiment, the processor may identify service information of the external electronic devices and/or proxy capability information indicating whether the electronic devices can perform the proxy server negotiation through the service discovery. According to an embodiment, if there is an electronic device that may function as a proxy server in the NAN cluster, the processor 120 may perform the proxy server negotiation with the corresponding electronic device based on the proxy capability information.

At operation 907, the processor 120 may determine whether the electronic device 101 operates as the proxy server or the proxy client based on the proxy server negotiation. According to an embodiment, the processor may dynamically determine the proxy server through the proxy server negotiation.

At operation 907, if the electronic device is determined to operate as the proxy client (e.g., answer No at operation 907) in accordance with the result of the proxy server negotiation, the processor 120, at operation 909, may operate as the proxy client by registering the service information and the awake interval information of the electronic device 101 in the external electronic device that is determined as the proxy server. According to an embodiment, while operating as the proxy client, the processor 120 may proceed with operation 903 and operation 905 to perform the service discovery and proxy server negotiation in a designated discovery window (e.g. every fourth discovery window). For example, while operating as the proxy client, the processor 120 may re-perform the service discovery and proxy server negotiation by performing operation 903 and operation 905 periodically or at a designated time.

At operation 907, if the electronic device is determined to operate as the proxy server (e.g., answer Yes at operation 907) in accordance with the result of the proxy server negotiation, the processor 120, at operation 911, may configure an expiration time after which the electronic device 101 would cease to operate as the proxy server.

At operation 913, the processor 120 may start its operation as the proxy server, and at operation 915, the processor 120 may perform a registration procedure with a proxy client. According to an embodiment, the processor 120 may register and manage the proxy client through exchange of the proxy registration request and the proxy registration response with the proxy client. According to an embodiment, the processor 120 may perform service discovery in place of the proxy client registered in the electronic device 101.

According to an embodiment, if an external electronic device is registered as the proxy client (e.g., the electronic device 101 acquires the service information and the awake interval information) during the proxy server negotiation operation at operation 905, the processor 120 may not perform the registration procedure at operation 915. According to an embodiment, it may be difficult for the processor 120 to determine whether to register as the client through the proxy server negotiation operation at operation 905. Accordingly, as exemplified in FIG. 9, the processor 120 may start an actual proxy server operation at operation 913, and in the case of starting the proxy server operation, the processor 120, at operation 915, may perform the registration procedure with the external electronic device. According to an embodiment, while the electronic device 101 operates as the proxy server, the processor 120 may receive or manage the proxy registration request for another proxy client. For example, the processor 120 may register and manage one or more proxy clients at least based on the capability of the electronic device 101.

At operation 917, the processor 120 may determine whether the time for functioning as the proxy server has expired.

At operation 917, if the time has not expired (e.g., answer No at operation 917), the processor 120 may proceed with operation 915 to perform operations subsequent to operation 915, such as operations 621 and 623 shown in FIG. 6. According to an embodiment, the processor 120 may monitor the time while performing service discovery in place of the proxy client registered in the electronic device 101.

At operation 917, if the time has expired (e.g., answer Yes at operation 917), the processor 120 may proceed with operation 903 to perform operations subsequent to operation 903. According to an embodiment, the two electronic devices (e.g., electronic device 101 and proxy client) may end their previous role (e.g., proxy server or proxy client), and they may newly perform the proxy server negotiation.

According to certain embodiments, the proxy server can be dynamically determined between the electronic devices in the same NAN cluster through the operation as shown in FIG. 9, and the role of the proxy server can be distributed (or switched) at various given time intervals.

Figure 10:
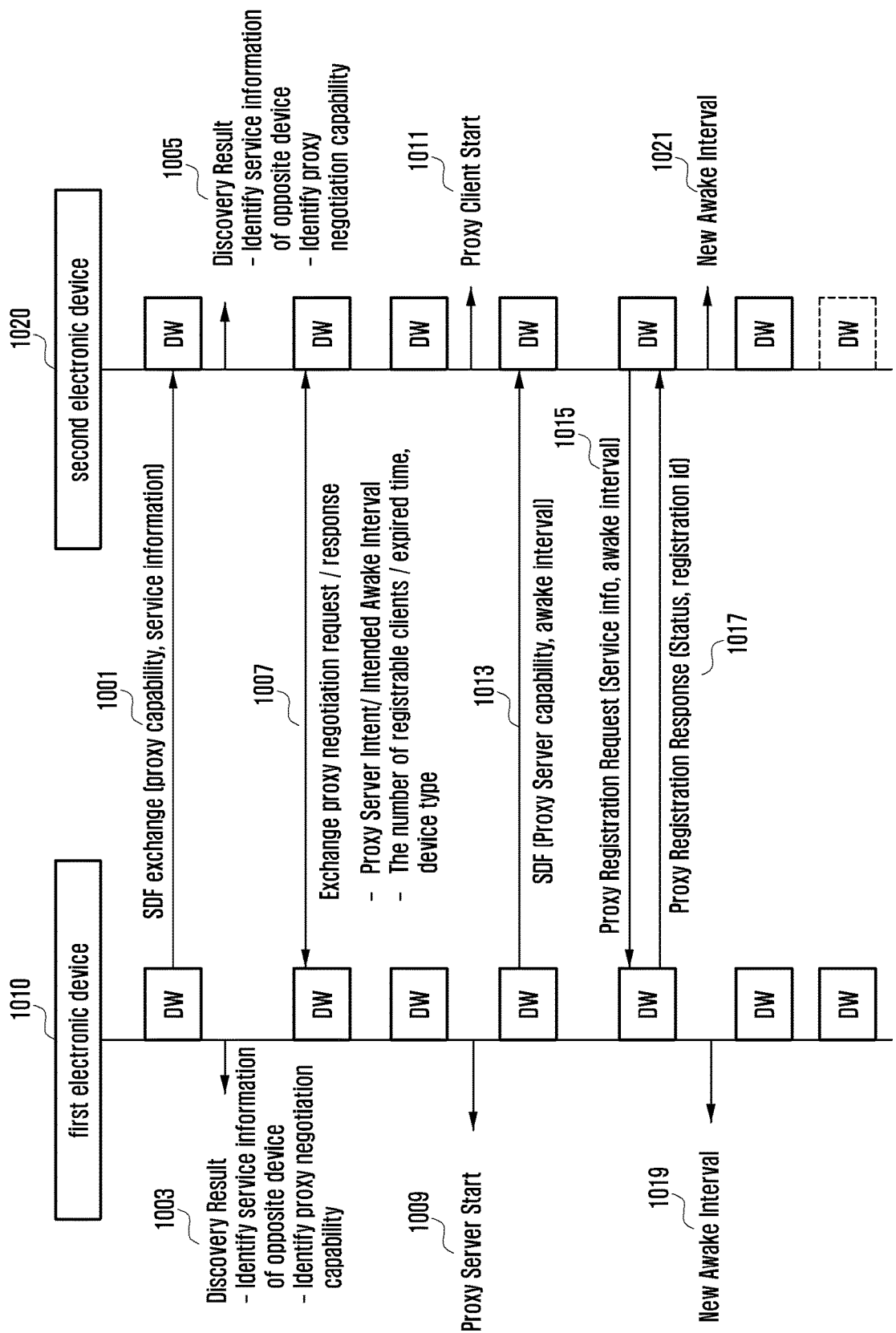
FIG. 10 is a diagram illustrating an example of a proxy server negotiation process according to an embodiment.

FIG. 10 is a diagram illustrating an example of a proxy server negotiation process according to an embodiment.

With reference to FIG. 10, at operation 1001, a first electronic device 1010 and a second electronic device 1020 may exchange a SDF (e.g., publish, subscribe, or follow-up message). According to an embodiment, the SDF may include capability information related to a proxy function (e.g., proxy capability information) in addition to service information. According to an embodiment, the capability information may include whether the corresponding electronic device supports a proxy server negotiation function. According to an embodiment, the proxy server negotiation may be performed, for example, between electronic devices that can operate as both a proxy server and a proxy client.

At operation 1003 and operation 1005, the first electronic device 1010 and the second electronic device 1020 may identify external electronic devices (e.g., opposite electronic devices) in a cluster through service discovery, and they may identify whether the corresponding external electronic devices support the proxy server negotiation. According to an embodiment, as the result of the service discovery, the first electronic device 1010 and the second electronic device 1020 may identify proxy capability information indicating whether the opposite electronic device can perform the proxy server negotiation with service information of the opposite electronic device.

At operation 1007, the first electronic device 1010 and the second electronic device 1020 may perform a proxy server negotiation process for determining the proxy server. According to an embodiment, the proxy server negotiation process may be limited to the electronic device including the same service information in the SDF. For example, the proxy server negotiation process may be performed only by limited electronic devices having the same service ID or the same service name.

According to an embodiment, the proxy server negotiation process may be performed through exchange of a proxy negotiation request message and a proxy negotiation response message. According to an embodiment, the proxy negotiation request message and the proxy negotiation response message may use the SDF, or they may use a separate NAF. According to an embodiment, the proxy negotiation request message and the proxy negotiation response message may include proxy server intent values. According to an embodiment, the first electronic device 1010 and the second electronic device 1020 may compare corresponding proxy server intent values with each other, and the electronic device having the higher proxy server intent value may be determined as the proxy server. According to an embodiment, the proxy server intent may be randomly determined, or it may be determined by the corresponding electronic device at least based on a battery amount of the electronic device, a device type, or a service kind.

According to an embodiment, the proxy negotiation request message and the proxy negotiation response message may include awake interval values desired by the corresponding electronic devices. According to an embodiment, the first electronic device 1010 and the second electronic device 1020 may determine the proxy servers based on the corresponding awake interval values in the same manner as the proxy server intents. For example, because the electronic device having a larger awake interval value may be more sensitive to current consumption, the electronic device having the smaller awake interval may be determined as the proxy server.

According to an embodiment, the proxy negotiation request message and the proxy negotiation response message may specify the number of supportable proxy clients and/or device types. For example, the first electronic device 1010 and the second electronic device 1020 may determine the proxy servers based on the above-described values. According to an embodiment, the proxy negotiation request message and the proxy negotiation response message may specify the expired time, and the expired time specified by the electronic device determined as the proxy server may be used. According to an embodiment, the expired time may mean a running time when the corresponding electronic device operates as the proxy server after the proxy server negotiation. According to an embodiment, if the expired time expires, the electronic devices 1010 and 1020 may determine a new proxy server through the proxy server negotiation process again.

According to an embodiment, FIG. 10 may show an example in which the first electronic device 1010 is determined as the proxy server. For example, the first electronic device 1010 may start the proxy server operation at operation 1009, and the second electronic device 1020 may start the proxy client operation at operation 1011.

At operation 1013, the first electronic device 1010 (the proxy server) may include proxy server capability information indicating the proxy server in the SDF, and it may transmit the SDF to the second electronic device 1020. The second electronic device 1020 may identify the proxy server capability information on the first electronic device 1010 through the received SDF.

At operation 1015, the second electronic device 1020 may request the first electronic device 1010 to register the second electronic device 1020 as the proxy client by transmitting a proxy registration request message including the service information and/or the awake interval information as described above to the first electronic device 1010.

At operation 1017, the first electronic device 1010 may register the second electronic device 1020 as the proxy client of the first electronic device 1010 by transmitting a proxy registration response message to the second electronic device 1020 in response to the proxy registration request from the second electronic device 1020.

At operation 1019 and operation 1021, the first electronic device 1010 and the second electronic device 1020 may perform the service discovery by applying a new awake interval. According to an embodiment, the second electronic device 1020 operating as the proxy client may reduce the current consumption by adjusting the awake interval in accordance with the configured awake interval, and the first electronic device 1010 operating as the proxy server may perform the service discovery in place of the service information of the second electronic device 1020.

Figure 11:
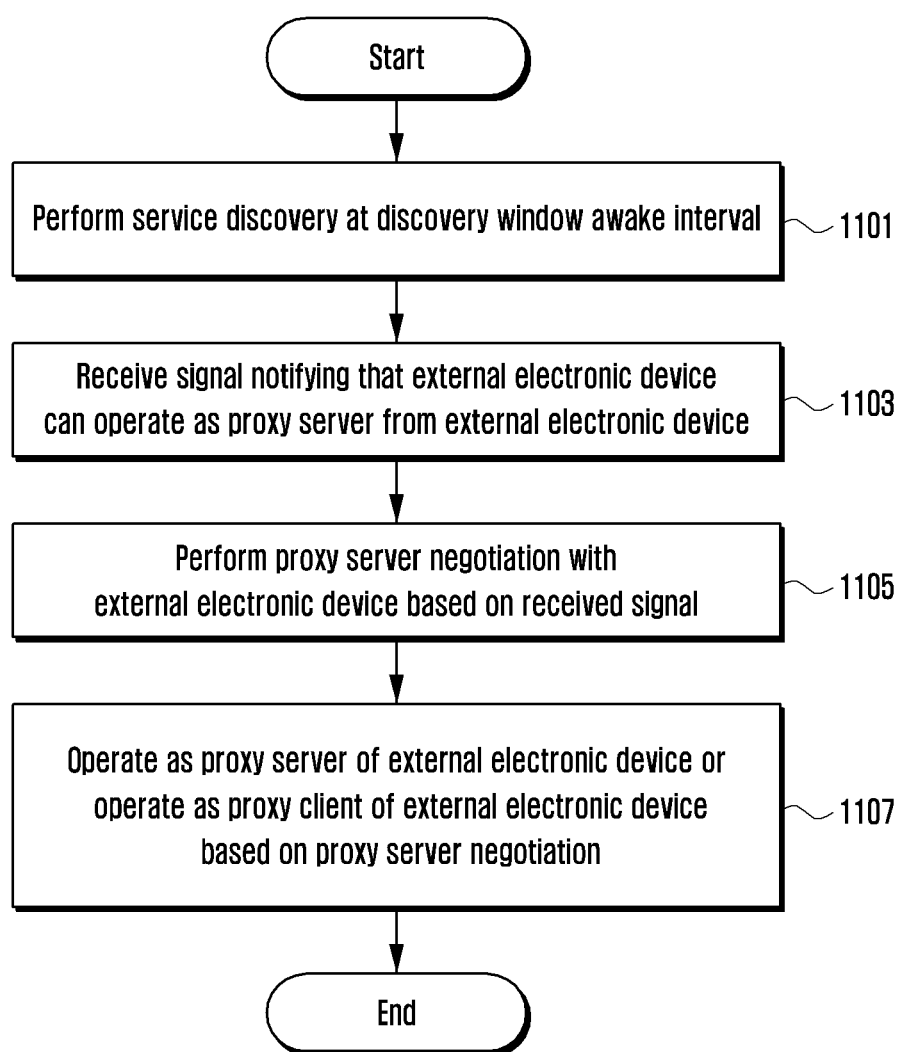
FIG. 11 is a flowchart illustrating an operation method of an electronic device according to an embodiment.

FIG. 11 is a flowchart illustrating an operation method of an electronic device according to an embodiment.

For example, FIG. 11 may show an example in which an electronic device 101 supporting functions of both a proxy server and a proxy client perform a proxy server negotiation with a neighboring external electronic device in a cluster, and the electronic device dynamically configure the proxy server or the proxy client in accordance with the result of the negotiation. According to an embodiment, the proxy server negotiation may be performed, for example, between electronic devices capable of operating as both the proxy server and the proxy client.

With reference to FIG. 11, at operation 1101, a processor 120 of an electronic device 101 may perform a service discovery at a discovery window awake interval through a wireless communication circuitry (e.g., wireless communication module 192 of FIG. 1). According to an embodiment, the processor 120 may control the operation of the wireless communication circuitry to perform communication at the discovery window awake interval synchronized with an external electronic device in the same NAN cluster based on a NAN protocol.

At operation 1103, the processor 120 may receive a signal for notifying that the external electronic device can operate as a proxy server from the external electronic device. According to an embodiment, the signal may include proxy server capability information and/or service information of the external electronic device.

At operation 1105, the processor 120 may perform a proxy server negotiation with the external electronic device based on the received signal. According to an embodiment, the proxy server negotiation may include a proxy server intent, a discovery window awake interval, the number of registrable clients, an expired time, and/or device type information.

At operation 1107, the processor 120 may make the electronic device 101 a proxy server of the external electronic device or it may make the electronic device 101 a proxy client of the external electronic device. According to an embodiment, if the electronic device 101 operates as the proxy client as the result of the negotiation, the processor 120 may transmit, to the external electronic device, proxy registration request information including service information and/or discovery window awake interval of the electronic device 101. According to an embodiment, if the electronic device 101 operates as the proxy server as the result of the negotiation, the processor 120 may configure an expiration time of the proxy server, and it may perform the service discovery based on the discovery window awake interval and/or the service information of the electronic device 101 and the external electronic device. According to an embodiment, the processor 120 may dynamically configure the expiration time when the electronic device 101 operates as the proxy server at least based on a battery amount of the electronic device 101, a device type, or a service kind.

Figure 12:
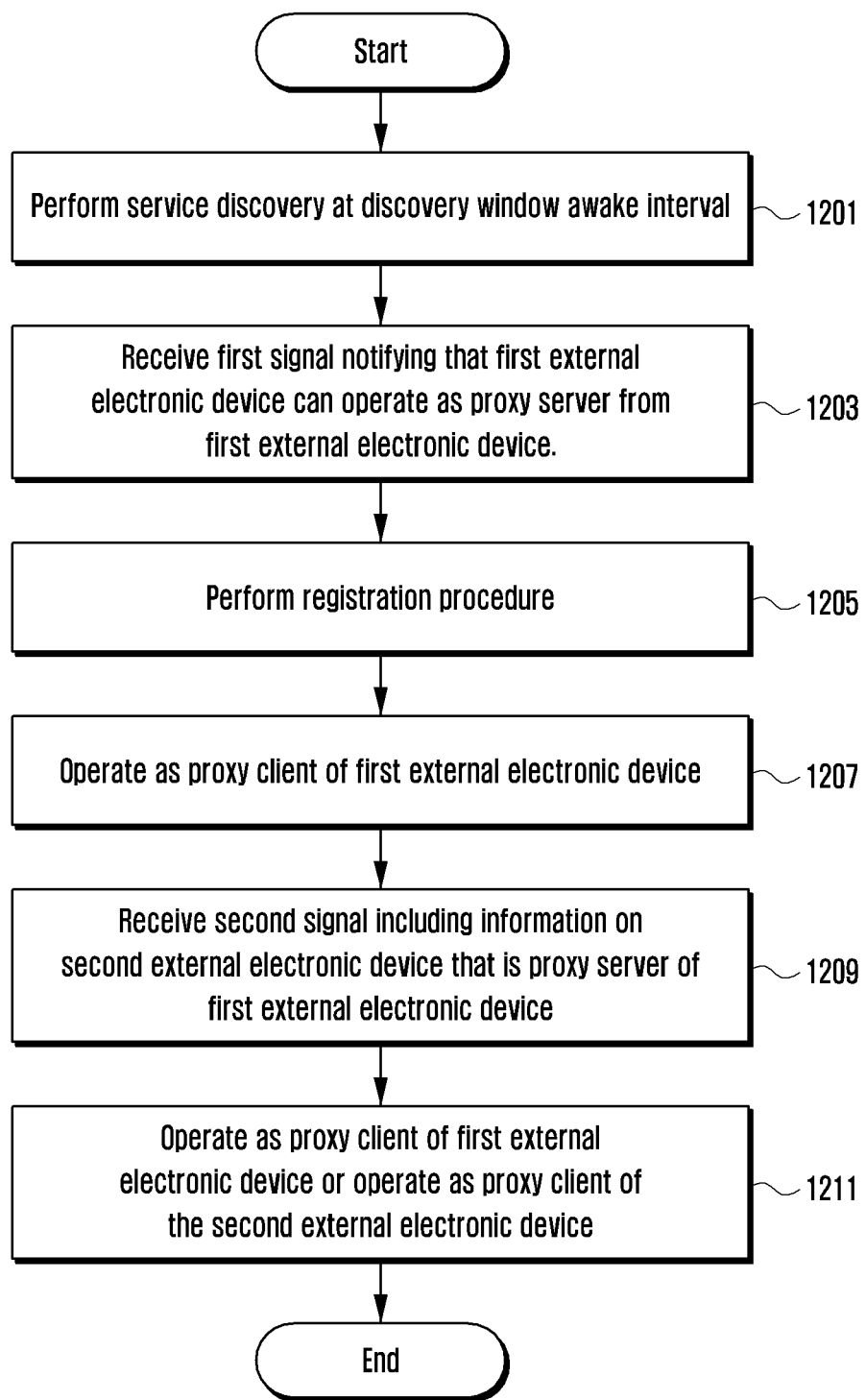
FIG. 12 is a flowchart illustrating an operation method of an electronic device according to an embodiment.

FIG. 12 is a flowchart illustrating an operation method of an electronic device according to an embodiment.

For example, FIG. 12 may show an example in which an electronic device 101 is registered and operates as a proxy client of an external electronic device.

With reference to FIG. 12, at operation 1201, a processor 120 of an electronic device 101 may perform a service discovery at a discovery window awake interval through a wireless communication circuitry (e.g., wireless communication module 192 of FIG. 1). According to an embodiment, the processor 120 may control the operation of the wireless communication circuitry to perform communication at the discovery window awake interval synchronized with an external electronic device in the same NAN cluster based on a NAN protocol.

At operation 1203, the processor 120 may receive a first signal for notifying that a first external electronic device can operate as a proxy server from the first external electronic device. According to an embodiment, the first signal may include proxy server capability information and/or service information of the first external electronic device.

At operation 1205, the processor 120 may perform a registration procedure with the first external electronic device based on the received first signal. According to an embodiment, the processor 120 of the electronic device 101 may be registered as the proxy client of the first external electronic device through exchange of a proxy registration request and a proxy registration response with the first external electronic device through a communication circuitry.

At operation 1207, the processor 120 of the electronic device 101 may start to operate as the proxy client of the first external electronic device.

At operation 1209, the processor 120 may receive a second signal including information on a second external electronic device (e.g., address information and awake interval information of the second external electronic device) from the first external electronic device while operating as the proxy client of the first external electronic device. According to an embodiment, the processor 120 may receive the second signal notifying that the second external electronic device can operate as the proxy server from the first external electronic device. According to an embodiment, the second signal may include a proxy server indication message including information on a new proxy server (e.g., second external electronic device that is the proxy server of the first external electronic device). According to an embodiment, the proxy server indication message may use a SDF or it may use a new NAF.

At operation 1211, the processor 120 may control the electronic device 101 to operate as the proxy client of the first external electronic device, or it may control the electronic device 101 to operate as the proxy client of the second external electronic device based on the received second signal. According to an embodiment, if the proxy server indication message including information on a new proxy server is received from the first external electronic device, the processor 120 may continue as the proxy client of the electronic device 101, or it may end the proxy client function with the first external electronic device and may be newly registered as the proxy client in the second external electronic device that is a new proxy server.

According to an embodiment, the processor 120 may determine to keep the operation with the first external electronic device or to end the proxy client function with the first external electronic device at least based on a battery amount of the first external electronic device, a device type, or a service kind. According to an embodiment, when the first external electronic device transmits the proxy server indication message including the information on the new proxy server to the electronic device 101, the first external electronic device may include, in the proxy server indication message, information for requesting that the electronic device 101 is to be registered as the proxy client of the second external electronic device. According to an embodiment, if such information is received from the first external electronic device, the processor may end the proxy client function with the first external electronic device, and it may be newly registered as a proxy client in the second external electronic device.

According to an embodiment of the disclosure, an operation method of an electronic device 101 may include broadcasting a first signal notifying that the electronic device 101 (e.g., electronic device 101 of FIG. 5) can operate as a first proxy server; receiving a second signal including a first proxy client registration request from a first external electronic device (e.g., first external electronic device 520 of FIG. 5); transmitting a third signal including a first proxy client registration response to the first external electronic device in response to the second signal; receiving a fourth signal notifying that a second external electronic device (e.g., second external electronic device 530 of FIG. 5) can operate as a second proxy server from the second external electronic device while operating as the first proxy server of the first external electronic device; transmitting a fifth signal including a second proxy client registration request to the second external electronic device based on the fourth signal; receiving a sixth signal including a second proxy client registration response corresponding to the fifth signal from the second external electronic device; and operating the electronic device 101 as a first proxy client of the second external electronic device in parallel with operating the electronic device 101 as the first proxy server of the first external electronic device.

According to an embodiment, the first signal may include proxy server capability information of the electronic device and/or first discovery window (DW) awake interval information of the electronic device, and the second signal may include second discovery window awake interval information of the first external electronic device.

According to an embodiment, the fifth signal may include first discovery window awake interval information of the electronic device 101 and second discovery window awake interval information of the first external electronic device registered as a second proxy client of the electronic device 101, and the first discovery window awake interval information of the electronic device 101 may be configured at least based on the second discovery window awake interval information.

According to an embodiment, the first discovery window awake interval information of the electronic device 101 may be configured as an interval that is smaller than or equal to the second discovery window awake interval information of the first external electronic device.

According to an embodiment, the method may include transmitting, to the first external electronic device, a proxy server indication including an address and/or discovery window awake interval information of the second external electronic device through service discovery frame (SDF) information received from the second external electronic device.

According to an embodiment, the method may include, based on the proxy server indication, maintaining the first external electronic device as a second proxy client of the electronic device, or ending the first external electronic device as the second proxy client of the electronic device in order to cause the first external electronic device to operate as a third proxy client of the second external electronic device.

According to an embodiment, the method may include, when the electronic device deviates from an area of the second external electronic device by a predetermined amount, ending the electronic device as the first proxy client of the second external electronic device and maintaining the electronic device as the first proxy server of the first external electronic device.

According to an embodiment, in the service discovery proxy function, the electronic device may dynamically (or adaptively) select the proxy server or proxy client function, and thus the current consumption can be reduced.

According to an embodiment, because the electronic device dynamically selects the proxy server or proxy client function, or the electronic device performs the functions of the proxy server and the proxy client at the same time, any one electronic device can continuously perform the proxy server function and thus the current consumption can be prevented from being overemphasized to the corresponding electronic device.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Although certain embodiments of the disclosure have been described in the specification and drawings, these are merely used as general meanings to assist those of ordinary skill in the art to gain a comprehensive understanding of the disclosure, and do not limit the scope of the disclosure.

Accordingly, it should be construed that all modifications or modified types derived based on the technical idea of the disclosure are included in the scope of the present disclosure in addition to the embodiments disclosed herein.

What is claimed is:

1. An electronic device comprising:
a housing;
at least one antenna;
at least one wireless communication circuitry located in the housing, operatively connected to the antenna, and configured to support a neighbor awareness networking (NAN) protocol;
a processor located in the housing and operatively connected to the wireless communication circuitry; and
a memory operatively connected to the processor,
wherein the memory stores instructions that, when being executed, cause the processor to:
broadcast a first signal notifying that the electronic device can operate as a first proxy server through the wireless communication circuitry,
receive a second signal including a first proxy client registration request from a first external electronic device,
transmit a third signal including a first proxy client registration response to the first external electronic device in response to the second signal,
receive a fourth signal notifying that a second external electronic device can operate as a second proxy server from the second external electronic device through the wireless communication circuitry while operating as the first proxy server of the first external electronic device,
transmit a fifth signal including a second proxy client registration request to the second external electronic device based on the fourth signal,
receive a sixth signal including a second proxy client registration response corresponding to the fifth signal from the second external electronic device, and
operate the electronic device as a first proxy client of the second external electronic device in parallel with operating the electronic device as the first proxy server of the first external electronic device.

2. The electronic device of claim 1, wherein the first signal comprises proxy server capability information of the electronic device and/or discovery window awake interval information.

3. The electronic device of claim 1, wherein the second signal comprises discovery window awake interval information of the first external electronic device.

4. The electronic device of claim 2, wherein the fifth signal comprises the discovery window awake interval information of the electronic device, and wherein the discovery window awake interval information of the electronic device is based at least on discovery window awake interval information of the first external electronic device.

5. The electronic device of claim 1, wherein the fifth signal comprises first discovery window awake interval information of the electronic device and second discovery window awake interval information of the first external electronic device registered as a second proxy client of the electronic device.

6. The electronic device of claim 5, wherein the first discovery window awake interval information of the electronic device is configured as an interval that is smaller than or equal to the second discovery window awake interval information of the first external electronic device.

7. The electronic device of claim 1, wherein the instructions further cause the processor to:
transmit, to the first external electronic device, a proxy server indication including an address and/or discovery window awake interval information of the second external electronic device through service discovery frame information received from the second external electronic device, and
based on the proxy server indication, maintain the first external electronic device as a second proxy client of the electronic device or cause the first external electronic device to end as the second proxy client of the electronic device and to operate as a third proxy client of the second external electronic device.

8. The electronic device of claim 1, wherein the instructions further cause the processor to, when the electronic device deviates from an area of the second external electronic device by a predetermined amount, end the electronic device as the first proxy client of the second external electronic device and maintain the electronic device as the first proxy server of the first external electronic device.

9. An operation method of an electronic device, comprising:
broadcasting a first signal notifying that the electronic device can operate as a first proxy server;
receiving a second signal including a first proxy client registration request from a first external electronic device;
transmitting a third signal including a first proxy client registration response to the first external electronic device in response to the second signal;
receiving a fourth signal notifying that a second external electronic device can operate as a second proxy server from the second external electronic device while operating as the first proxy server of the first external electronic device;
transmitting a fifth signal including a second proxy client registration request to the second external electronic device based on the fourth signal;
receiving a sixth signal including a second proxy client registration response corresponding to the fifth signal from the second external electronic device; and
operating the electronic device as a first proxy client of the second external electronic device in parallel with operating the electronic device as the first proxy server of the first external electronic device.

10. The method of claim 9, wherein the first signal includes proxy server capability information of the electronic device and/or first discovery window awake interval information of the electronic device, and
the second signal includes second discovery window awake interval information of the first external electronic device.

11. The method of claim 9, wherein the fifth signal comprises first discovery window awake interval information of the electronic device and second discovery window awake interval information of the first external electronic device registered as a second proxy client of the electronic device, and
the first discovery window awake interval information of the electronic device is configured at least based on the second discovery window awake interval information.

12. The method of claim 11, wherein the first discovery window awake interval information of the electronic device is configured as an interval that is smaller than or equal to the second discovery window awake interval information of the first external electronic device.

13. The method of claim 9, further comprising transmitting, to the first external electronic device, a proxy server indication including an address and/or discovery window awake interval information of the second external electronic device through service discovery frame information received from the second external electronic device.

14. The method of claim 13, further comprising, based on the proxy server indication, maintaining the first external electronic device as a second proxy client of the electronic device, or ending the first external electronic device as the second proxy client of the electronic device in order to cause the first external electronic device to operate as a third proxy client of the second external electronic device.

15. The method of claim 9, further comprising, when the electronic device deviates from an area of the second external electronic device by a predetermined amount, ending the electronic device as the first proxy client of the second external electronic device and maintaining the electronic device as the first proxy server of the first external electronic device.

\* \* \* \* \*